(12) United States Patent
Ichishi et al.

(10) Patent No.: US 7,497,251 B2
(45) Date of Patent: Mar. 3, 2009

(54) VEHICLE AIR CONDITIONER

(75) Inventors: Yoshinori Ichishi, Kariya (JP); Tatsumi Kumada, Gamagori (JP)

(73) Assignee: Denso Corporation, Kariya (JP)

( * ) Notice: Subject to any disclaimer, the term of this patent is extended or adjusted under 35 U.S.C. 154(b) by 610 days.

(21) Appl. No.: 10/989,225

(22) Filed: Nov. 15, 2004

(65) Prior Publication Data

US 2005/0103488 A1 May 19, 2005

(30) Foreign Application Priority Data

Nov. 17, 2003 (JP) ............................. 2003-386979
Aug. 19, 2004 (JP) ............................. 2004-239670

(51) Int. Cl.
*B60H 1/00* (2006.01)

(52) U.S. Cl. .................. 165/202; 165/204; 165/42; 165/43; 236/91 C; 236/91 E; 236/49.3; 454/75; 374/121; 702/131; 702/135

(58) Field of Classification Search ................ 236/1 C, 236/91 C, 91 E, 49.3; 165/42, 43, 202, 204; 454/75; 374/121; 702/131, 135
See application file for complete search history.

(56) References Cited

U.S. PATENT DOCUMENTS 6,202,934 B1 * 3/2001 Kamiya et al. ............ 236/91 C
6,397,615 B1 * 6/2002 Kawai et al. ............... 236/91 C
6,550,686 B2 * 4/2003 Kawai et al. ............... 236/49.3
6,659,358 B2 * 12/2003 Kamiya et al. ............. 236/49.3

FOREIGN PATENT DOCUMENTS

JP          2-158412          6/1990

\* cited by examiner

*Primary Examiner*—John K Ford
(74) *Attorney, Agent, or Firm*—Harness, Dickey & Pierce, PLC

(57) ABSTRACT

In a vehicle air conditioner, a first air-conditioning control value is calculated based on a surface temperature detected by a non-contact temperature sensor in a temperature detection area of a passenger compartment. When it is determined that an obstacle exists between the temperature detection area and the non-contact temperature sensor, a second air-conditioning control value is calculated according to a temperature information that is influenced less by the obstacle than the detected surface temperature. When it is determined that the obstacle does not exist, an air conditioning state of the passenger compartment is controlled based on the first air-conditioning control value. When it is determined that the obstacle exists, the first air-conditioning control value is corrected to approach the second air-conditioning control value to calculate a corrected air-conditioning control value, so that the air conditioning state can be controlled satisfactorily.

17 Claims, 15 Drawing Sheets

VEHICLE AIR CONDITIONER

CROSS REFERENCE TO RELATED APPLICATION

This application is based on Japanese Patent Applications No. 2003-386979 filed on Nov. 17, 2003 and No. 2004-239670 filed on Aug. 19, 2004, the disclosure of which is incorporated herein by reference.

FIELD OF THE INVENTION

The present invention relates to a vehicle air conditioner having a non-contact temperature sensor that detects a surface temperature of a passenger within a passenger compartment in non-contact so that an air conditioning state in the passenger compartment is controlled.

BACKGROUND OF THE INVENTION

In an air conditioning system for a vehicle, a surface temperature (e.g., face skin temperature of a passenger) in a temperature detection area of a passenger compartment is detected by a non-contact temperature sensor (e.g., infrared rays temperature sensor). According to the surface temperature, an air conditioning state in the passenger compartment is controlled to provide a comfortable air conditioning to the passenger (refer to JP-A-2-158412).

However, in the air conditioning system, when there is an obstacle such as a fired cigarette with an abnormal temperature or a vanity mirror with a room temperature between the infrared rays temperature sensor and the passenger, the infrared rays temperature sensor detects not only the surface temperature of the passenger but also the surface temperature of the obstacle. Accordingly, the air conditioning state in the passenger compartment cannot be normally controlled.

SUMMARY OF THE INVENTION

In view of the above-described problems, it is an object of the present invention to provide a vehicle air conditioner for controlling an air conditioning state of a passenger compartment by using a non-contact temperature sensor. In the vehicle air conditioner, an abnormal control of the air conditioning state due to an obstacle between the non-contact temperature sensor and a passenger can be effectively restricted.

According to the present invention, a vehicle air conditioner includes: an air conditioning unit for conditioning air in a passenger compartment of the vehicle; a non-contact temperature sensor for detecting a surface temperature of a temperature detection area in the passenger compartment in non-contact; a first calculating means for calculating a first air-conditioning control value, which indicates a first target air conditioning state in the passenger compartment, based on the detected surface temperature of the non-contact temperature sensor; a determining unit for determining whether an obstacle having an abnormal temperature exists between the temperature detection area and the non-contact temperature sensor; a second calculating means for calculating a second air-conditioning control value indicating a second target air conditioning state in the passenger compartment according to a temperature information when the determining unit determines that the obstacle exists between the temperature detection area and the non-contact temperature sensor; and a control unit for controlling the air conditioning unit. Here, the temperature information has an influence degree due to the temperature of the obstacle less than the detected surface temperature of the non-contact temperature sensor. In this air conditioner, when the determining unit determines that the obstacle does not exist between the temperature detection area and the non-contact temperature sensor, the control unit controls the air conditioning unit based on the first air-conditioning control value. In contrast, when the determining unit determines that the obstacle exists between the temperature detection area and the non-contact temperature sensor, the control unit corrects the first air-conditioning control value to be approached to the second air-conditioning control value so as to calculate a corrected air-conditioning control value, and the control unit controls the air conditioning unit based on the corrected air conditioning control value.

In the present invention, because the control unit controls the air conditioning unit based on the corrected air-conditioning control value when it is determined that the obstacle exists between the temperature detection area and the non-contact temperature sensor, the abnormal control of the air conditioning state in the passenger compartment due to the obstacle can be effectively restricted.

For example, when a difference between the first air-conditioning control value and the second air-conditioning control value is larger than a predetermined value, the determining unit determines that the obstacle exists between the temperature detection area and the non-contact temperature sensor. In addition, when the determining unit determines that the obstacle exists between the temperature detection area and the non-contact temperature sensor, the control unit calculates the corrected air-conditioning control value by subtracting the predetermined value from the second air-conditioning control value when the first air-conditioning control value is smaller than the second air-conditioning control value; and the control unit calculates the corrected air-conditioning control value by adding the predetermined value to the second air-conditioning control value when the first air-conditioning control value is larger than the second air-conditioning control value.

Alternatively, when the determining unit determines that the obstacle exists between the temperature detection area and the non-contact temperature sensor, the control unit adds the predetermined value to the first air-conditioning control value to calculate the corrected air-conditioning control value when the first air-conditioning control value is smaller than the second air-conditioning control value; and the control unit subtracts the predetermined value from the first air-conditioning control value to calculate the corrected air-conditioning control value when the first air-conditioning control value is larger than the second air-conditioning control value.

Preferably, the air conditioner further includes a contact temperature sensor for detecting an air temperature of the passenger compartment by contacting. In this case, the second calculating means uses the detected air temperature of the contact temperature sensor as the temperature information for calculating the second air-conditioning control value. More preferably, the non-contact temperature sensor includes a skin temperature detection element for detecting a passenger's skin temperature as the surface temperature of the temperature detection area. Alternatively, the non-contact temperature sensor further includes a clothes temperature detection element for detecting a clothes temperature of the passenger. In this case, the second calculating means calculates the second air-conditioning control value by using at least the clothes temperature detected by the clothes temperature detection element as the temperature information.

More preferably, the non-contact temperature sensor includes a plurality of detection elements, which are arranged for detecting in non-contact the surface temperatures of corresponding parts separated in the temperature detection area, and the determining unit determines that the obstacle exists between the temperature detection area and the non-contact temperature sensor when the number of the detection elements which have substantially the same detected surface temperature is equal to or larger than a predetermined number.

Alternatively, when the number of the detection elements, which have detected surface temperature changed by equal to or larger than a predetermined temperature at the same time, is equal to or larger than a predetermined value, the determining unit determines that the obstacle exists between the temperature detection area and the non-contact temperature sensor.

Alternatively, when the detected surface temperature of predetermined detection elements among the plurality of detection elements changes by equal to or larger than a predetermined temperature, the determining unit determines that the obstacle exists between the temperature detection area and the non-contact temperature sensor. For example, the predetermined detection elements of the plurality of detection elements are at least two detection elements separated from each other. Alternatively, when the detected surface temperature of predetermined detection elements among the plurality of detection elements are substantially same, the determining unit determines that the obstacle exists between the temperature detection area and the non-contact temperature sensor. For example, the predetermined detection elements are upper side detection elements and lower side detection elements among the plurality of detection elements.

In the air conditioner of the present invention, the air conditioning unit can include a plurality of temperature adjusting units for adjusting the temperature of air to be blown into the passenger compartment. In this case, the first and second calculating units calculate the first and second target temperatures to be adjusted by the temperature adjusting units, as the first and the second air-conditioning control values, respectively. For example, the temperature adjusting units are arranged to correspond to seats in the passenger compartment, the non-contact temperature sensor detects the surface temperature corresponding to each of the seats of the temperature detection area, the first and the second calculating means respectively calculate the first and the second target temperatures corresponding to each of the seats, and the determining unit determines whether the obstacle exists between the non-contact temperature sensor and the temperature detection area in each of the seats. In this case, when the determining unit determines that the obstacle does not exist between the non-contact temperature sensor and the temperature detection area, the control unit controls the temperature adjusting units based on the first target temperature. In contrast, when the determining unit determines that the obstacle exists between the non-contact temperature sensor and the temperature detection area, the control unit corrects the first target temperature to be approached to the second target temperature so as to calculate a corrected target temperature used as the corrected air-conditioning control value, and the control unit controls the temperature adjusting units based on the corrected target temperature. Accordingly, in the vehicle air conditioner, an abnormal control of the air conditioning state due to an obstacle between the non-contact temperature sensor and a passenger can be more effectively restricted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
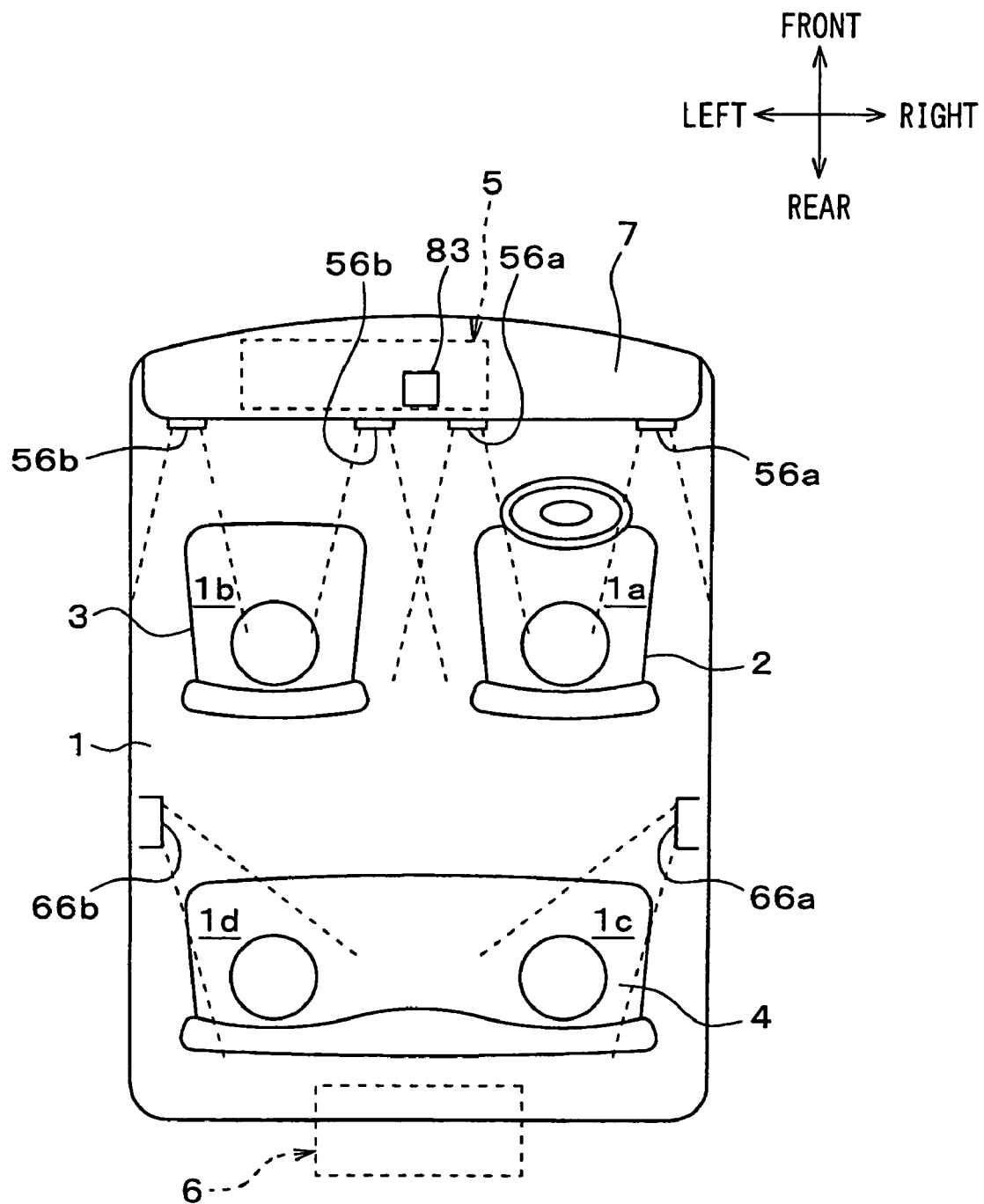
FIG. 1 is a schematic diagram showing an air blowing-out port arrangement and a seat arrangement in a passenger compartment according to a first embodiment of the present invention.
Figure 2:
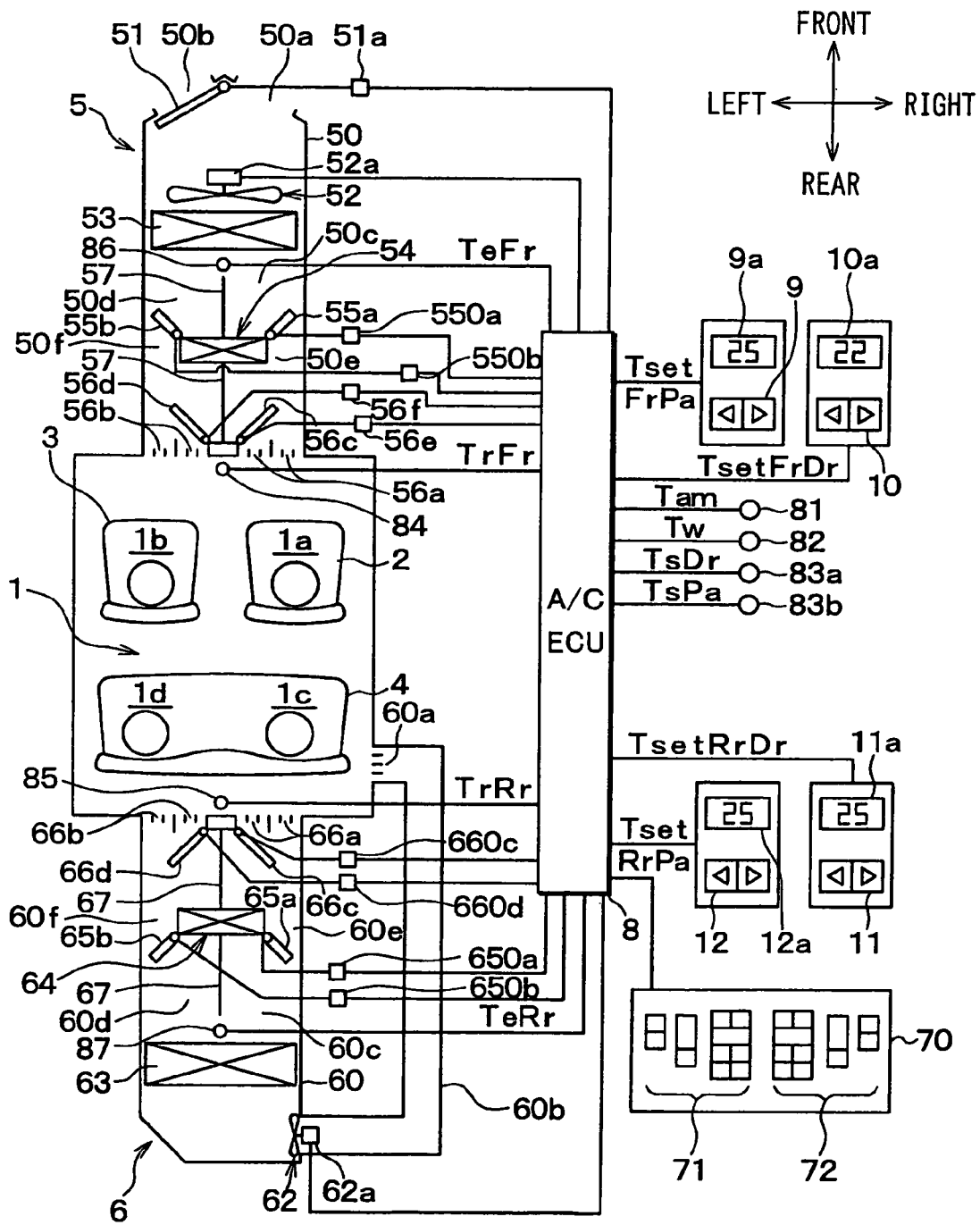
FIG. 2 is a schematic diagram showing an entire structure of a vehicle air conditioner according to the first embodiment.

A first embodiment of the present invention will be now described with reference to FIGS. 1-10. In the first embodiment, a vehicle air conditioner independently controls each of air-conditioning operations of air conditioning zones $1a$, $1b$, $1c$, $1d$ within a vehicle compartment interior (passenger compartment) 1. FIG. 1 is a schematic diagram showing the arrangement of the air conditioning zones $1a$, $1b$, $1c$, $1d$. The air conditioning zone $1a$ is located on a right-hand side in a front seat air conditioning zone. The air conditioning zone $1b$ is located on a left-hand side in the front seat air conditioning zone. The air conditioning zone $1c$ is located on a right-hand side in an air conditioning zone of a rear seat 4. The air conditioning zone $1d$ is located on a left-hand side in the air conditioning zone of the rear seat 4. The arrows of FIG. 1 show front, rear, left and right directions of the vehicle. FIGS. 1 and 2 show a vehicle state having a right steering wheel. Therefore, the air conditioning zone $1a$ is positioned on a side of a driver's seat 2, and the air conditioning zone $1b$ is positioned on a side of an assistant front-passenger's seat 3. A front right seat, a front left seat, a rear right seat and a rear left seat are placed in the air conditioning zones $1a$, $1b$, $1c$ and $1d$, respectively.

As shown in FIG. 1, this vehicle air conditioner has an interior air conditioner unit portion constructed with a front seat air conditioning unit 5 and a rear seat air conditioning unit 6. The front seat air conditioning unit 5 respectively independently controls air-conditioning states of the air conditioning zones $1a$, $1b$, and the rear seat air conditioning unit 6 respectively independently controls air-conditioning states of the air conditioning zones $1c$, $1d$. Generally, the air-conditioning state includes a temperature, an air amount to be blown into the passenger compartment 1, and switching operation of blowing-out ports (i.e., air outlet mode) and the like.

The front seat air conditioning unit 5 is arranged inside an instrument panel 7 (dashboard), which is positioned most forward in the passenger compartment 1. The rear seat air conditioning unit 6 is arranged most backward in the passenger compartment 1. The front seat air conditioning unit 5 has a duct 50 for sending and blowing air to a front seat side of the passenger compartment 1. An inside air introducing inlet $50a$ for introducing inside air (i.e., air inside the passenger compartment) from the passenger compartment 1 and an outside air introducing inlet $50b$ for introducing outside air (i.e., air outside the passenger compartment) from the vehicle compartment exterior are provided in this duct 50.

Further, an inside-outside air switching door 51 for selectively opening and closing the outside air introducing inlet $50b$ and the inside air introducing inlet $50a$ is arranged in the duct 50. A servomotor $51a$ as a driving means is connected to this inside-outside air switching door 51.

Further, a centrifugal type blower 52 for generating the air flow toward the passenger compartment 1 is arranged on an air downstream side of the outside air introducing inlet $50b$ and the inside air introducing inlet $50a$ within the duct 50. The centrifugal type blower 52 is constructed with a vane wheel and a blower motor $52a$ for rotating this vane wheel.

Furthermore, an evaporator 53 as an air cooling means for cooling the air is arranged on an air downstream side of the centrifugal type blower 52 within the duct 50. A heater core 54 as an air heating means is arranged on an air downstream side of this evaporator 53 within the duct 50.

A partition plate 57 is arranged on an air downstream side of the evaporator 53 within the duct 50. This partition plate 57 partitions the interior of the duct 50 into a driver seat side passage $50c$ (e.g., right front seat side passage) and an assistant driver seat side passage $50d$ (e.g., front-passenger's seat side passage or left front seat side passage) Here, a bypass passage $50e$ is formed on a one side of the heater core 54 in the driver seat side passage $50c$. Through the bypass passage $50e$, cool air cooled by the evaporator 53 bypasses the heater core 54 in the driver seat side passage $50c$. A bypass passage $50f$ is formed on the other side of the heater core 54 in the assistant driver seat side passage $50d$. Through the bypass passage $50f$, cool air cooled by the evaporator 53 bypasses the heater core 54 in the assistant driver seat side passage $50d$.

Air mix doors $55a$, $55b$ are arranged on an air upstream side of the heater core 54. The air mix door $55a$ adjusts the ratio of an air amount passing through the heater core 54 and an amount passing through the bypass passage $50e$ in the driver seat side passage $50c$, in accordance with an open degree of the air mix door $55a$. Therefore, conditioned air to be blown to the front right side air-conditioning zone $1a$ can be adjusted.

Further, the air mix door $55b$ adjusts the ratio of an air amount passing the heater core 54 and an air amount passing the bypass passage $50f$ in the assistant driver seat side passage $50d$, in accordance with an open degree of the air mix door $55b$. Therefore, conditioned air to be blown to the front left side air-conditioning zone $1b$ can be adjusted.

Here, servomotors $550a$, $550b$ as driving means are respectively connected to the air mix doors $55a$, $55b$. The open degrees of the air mix doors $55a$, $55b$ are respectively adjusted by the servomotors $550a$, $550b$.

Further, the evaporator 53 is a cooling heat exchanger constituting a well-known refrigerating cycle together with a compressor, a condenser, a liquid receiver and a pressure reducing device that are unillustrated. In the evaporator 53, low-pressure refrigerant is evaporated by absorbing an evaporation latent heat from air flowing in the duct 50, so that air flowing through the evaporator 53 in the duct 50 is cooled.

The compressor is connected to an engine of the vehicle through an unillustrated electromagnetic clutch. The operation of this compressor is stopped and controlled by controlling connection and disconnection of the electromagnetic clutch.

The heater core 54 is a heat exchanger using engine cooling water (hot water) of the vehicle as a heat source. This heater core 54 heats the cool air after being cooled by the evaporator 53.

Further, a driver seat side face blowing-out port $56a$ is opened on an air downstream side of the heater core 54 in the duct 50. The driver seat side face blowing-out port $56a$ blows out the conditioned air toward the upper half of the body of a driver sitting on the driver seat from the driver seat side passage $50c$. Here, a blowing-out port switching door $56c$ for opening and closing the face blowing-out port $56a$ is arranged at an air upstream portion of the face blowing-out port $56a$ in the duct 50. This blowing-out port switching door $56c$ is opened and closed by a servomotor $56e$ as a driving means.

A driver seat side foot blowing-out port for blowing-out the conditioned air to the lower half of the body of the driver from the driver seat side passage $50c$ and a driver seat side defroster blowing-out port for blowing-out the conditioned air to the inner surface of a front windshield on the driver's seat side are arranged in the duct 50 although these blowing-out ports are omitted in the drawings.

Blowing-out port switching doors for opening and closing the respective blowing-out ports are arranged in air upstream portions of the driver seat side foot blowing-out port and the driver seat side defroster blowing-out port. The respective blowing-out port switching doors are opened and closed by the servomotors.

Further, a front-passenger's seat side face blowing-out port 56b is opened on an air downstream side of the heater core 54 in the duct 50. The front-passenger's seat side face blowing-out port 56b blows out the conditioned air toward the upper half of the body of a passenger sitting on the front-passenger's seat from the front-passenger's seat side passage 50d.

Here, a blowing-out port switching door 56d for opening and closing the face blowing-out port 56b is arranged at an air upstream portion of the face blowing-out port 56b in the duct 50. This blowing-out port switching door 56d is opened and closed by a servomotor 56f as a driving means.

Further, the face blowing-out ports 56a, 56b are arranged on a dashboard 7 to be divided into a center face air outlet at a center area in a vehicle right-left direction (vehicle width direction) and a side face air outlet at right and left sides of the center face air outlet.

A front-passenger's seat side foot blowing-out port for blowing-out the conditioned air to the lower half of the body of the front passenger from the front-passenger's seat side passage 50d, and a front-passenger's seat side defroster blowing-out port for blowing-out the conditioned air to the inner surface of the front windshield on the front-passenger's seat side are arranged in the duct 50 although these blowing-out ports are omitted in the drawings.

Blowing-out port switching doors for opening and closing the respective blowing-out ports are arranged in air upstream portions of the front-passenger's seat side foot blowing-out port and the front-passenger's seat side defroster blowing-out port. The blowing-out port switching doors are operatively linked by a servomotor 56f.

Further, the rear seat air conditioning unit 6 has a duct 60 for sending and blowing air to the rear seat area in the passenger compartment 1. Only the inside air is introduced from the passenger compartment 1 into an inside air introducing duct 60b through an inside air introducing inlet 60a.

Here, a centrifugal type blower 62 for generating an air flow toward the passenger compartment 1 is arranged on an air downstream side of the inside air introducing duct 60b. The centrifugal type blower 62 is constructed with a vane wheel and a blower motor 62a for rotating this vane wheel. The vane wheel of the blower 62 is indicated in FIG. 2 as an axial vane wheel. However, actually, the vane wheel of the blower 62 is a centrifugal vane wheel.

Further, an evaporator 63 as an air cooling means for cooling the introduced air is arranged on an air downstream side of the centrifugal type blower 62 within the duct 60. A heater core 64 as an air heating means for heating the air is arranged on an air downstream side of this evaporator 53.

A partition plate 67 is arranged on a downstream portion of the evaporator 63 within the duct 60. This partition plate 67 partitions the interior of the duct 60 into a rear right side passage 60a (i.e., driver's seat side passage) and a rear left side passage 60d (i.e., front-passenger's seat side passage).

Here, a bypass passage 60e is formed on a one side of the heater core 64 in the rear right side passage 60c. Through the bypass passage 60e, cool air cooled by the evaporator 63 bypasses the heater core 64 in the rear right side passage 60c.

A bypass passage 60f is formed on the other side of the heater core 64 in the rear left seat side passage 60d. Through the bypass passage 60f, the cool air cooled by the evaporator 63 bypasses the heater core 64 in the rear left seat side passage 60d.

Air mix doors 65a, 65b are arranged on an air upstream side of the heater core 64. The air mix door 65a adjusts the ratio of an air amount passing through the heater core 64 and an air amount passing through the bypass passage 60e in the cool air flowing in the rear right seat side passage 60c, in accordance with an open degree of the air mix door 65a.

The air mix door 65b adjusts the ratio of an air amount passing through the heater core 64 and an air amount passing through the bypass passage 60f in the cool air passing the rear left seat side passage 60d, in accordance with an open degree of the air mix door 65b.

Servomotors 650a, 650b as a driving means are respectively connected to the air mix doors 65a, 65b. The open degrees of the air mix doors 65a, 65b are respectively adjusted by the servomotors 650a, 650b.

Here, the evaporator 63 is piped and connected in parallel with the above evaporator 53, and is a heat exchanger constituting one constructional element of the above well-known refrigerating cycle.

The heater core 64 is a heat exchanger using the engine cooling water (warm water) of the vehicle as a heat source. The heater core 64 is connected to the above heater core 54 in parallel therewith, and heats the cool air after being cooled by the evaporator 63.

Further, a rear right face blowing-out port 66a is opened on an air downstream side of the heater core 64 in the rear right air passage 60c within the duct 60. The rear right face blowing-out port 66a blows out the conditioned air toward the upper half of the body of a passenger sitting on the right-hand side (i.e., the rear side of the driver seat) of a rear seat from the rear right side passage 60c.

A rear left face blowing-out port 66b is opened on an air downstream side of the heater core 64 in the rear left side passage 60d within the duct 60. This face blowing-out port 66b blows out the conditioned air toward the upper half of the body of a passenger sitting on the left-hand side (i.e., the rear side of the assistant driver seat) of the rear seat from the rear left side passage 60d.

Here, a face door 66c for opening and closing the rear right face blowing-out port 66a is arranged in an air upstream portion of the rear right face blowing-out port 66a. This blowing-out port switching door 66a is opened and closed by a servomotor 660c as a driving means.

Similarly, a face door 66d for opening and closing the rear left face blowing-out port 66b is arranged in an air upstream portion of the rear left face blowing-out port 66b. This blowing-out port switching door 66b is opened and closed by a servomotor 660d as a driving means.

A rear right side foot blowing-out port for blowing out the conditioned air to the lower half of the body of the rear seat right-hand side passenger from the rear right side passage 60c is arranged in the duct 60 although this rear right side foot blowing-out port is omitted in the drawings.

Further, a foot door for opening and closing this foot blowing-out port is arranged in an air upstream portion of the rear right side foot blowing-out port. This foot door is opened and closed by the servomotor 660c.

Similarly, a rear left side foot blowing-out port for blowing out the conditioned air to the lower half of the body of the rear seat left-hand side passenger from the rear left side passage 60d is arranged in the duct 60 although this foot blowing-out port is omitted in the drawings. A foot door for opening and closing this rear left side foot blowing-out port is arranged in an air upstream portion of this rear left side foot blowing-out port. This foot blowing-out port switching door is opened and closed by the servomotor 660d.

Further, an electronic controller (hereinafter called an air conditioning ECU 8) for controlling each of the air conditioning operations of the front seat air conditioning unit 5 and the rear seat air conditioning unit 6 is provided in the vehicle air conditioner.

An outside air temperature sensor 81, an engine-cooling water temperature sensor 82, solar radiation sensors 83a (83) and 83b (83), a front seat side evaporator temperature sensor 86 and a rear seat side evaporator temperature sensor 87 are connected to the air conditioning ECU 8.

The outside air temperature sensor 81 detects an outside air temperature outside the passenger compartment, and an outside air temperature signal Tam corresponding to the detected temperature is outputted to the air conditioning ECU 8. The cooling water temperature sensor 82 detects a cooling water temperature of the engine, and a cooling water temperature signal Tw corresponding to the detected temperature is outputted to the air conditioning ECU 8.

The solar radiation sensors 83a and 83b are positioned on an upper surface of the instrument panel 7 (i.e., at an inner side of the front windshield) at an approximate center area in the vehicle right-left direction. The solar radiation sensors 83a and 83b are respectively arranged to face a right side and a left side of the vehicle to detect solar radiation amounts irradiated to the driver seat side (i.e., right seat side) and the assistant driver seat side (i.e., left seat side), so that solar radiation signals TsDr and TsPa detected by the solar radiation sensors 83a and 83b are respectively outputted to the air conditioning ECU 8 corresponding to the detected solar radiation amounts.

The inside air temperature sensor 84 detects an air temperature in the air conditioning zones 1a, 1b, and outputs an inside air temperature signal TrFr corresponding to the detected inside air temperature to the air conditioning ECU 8. Similarly, the inside air temperature sensor 85 detects an air temperature in the air conditioning zones 1c, 1d, and outputs an inside air temperature signal TrRr corresponding to the detected inside air temperature to the air conditioning ECU 8.

In this case, thermistors are used as the air temperature sensors 84 and 85 for detecting the air temperature in contact.

The front seat side evaporator temperature sensor 86 detects an air temperature immediately after passing through the front seat side evaporator 53, and outputs an evaporator temperature signal TeFr corresponding to the detected temperature of the evaporator 86 to the air conditioning ECU 8. The rear seat side evaporator temperature sensor 87 detects an air temperature immediately after passing through the rear seat side evaporator 63, and outputs an evaporator temperature signal TeRr corresponding to the detected temperature of the evaporator 87 to the air conditioning ECU 8.

Temperature setting switches 9, 10, 11, 12 are respectively provided for setting desirable temperatures TsetFrDr, TsetFrPa, TsetRrDr, TsetRrPa, which will be inputted to the air-conditioning ECU, of the air conditioning zones 1a, 1b, 1c, 1d by a passenger. The temperature setting switches 9-12 are connected to the air-conditioning ECU 8. Displays 9a, 10a, 11a, 12a for displaying the setting contents of the desirable temperatures, etc. are respectively arranged in the vicinity of the temperature setting switches 9, 10, 11, 12.

As a non-contact temperature sensor, an infrared rays temperature sensor 70, connected with an input side of the air conditioning ECU 8, is arranged at a front side on a ceiling portion approximately at the center area in the vehicle right-left direction. That is, the infrared rays temperature sensor 70 is positioned at an upper side of the solar radiation sensor 83.

The air conditioning ECU 8 is a well-known device constructed with an analog/digital converter, a microcomputer, etc. The air conditioning ECU 8 is constructed such that output signals respectively outputted from sensors 81, 82, 83 (83a, 83b), 84, 85, 86, 87 and switches 9, 10, 11, 12 are analog/digital-converted by the analog/digital converter and are inputted to the microcomputer.

The microcomputer is a well-known microcomputer constructed with a memory such as a ROM, a RAM, etc., and a CPU (central processing unit), etc. When an ignition switch is turned on, electric power is supplied from an unillustrated battery to the microcomputer.

The infrared rays temperature sensor 70 is constructed with thermopile detection elements which detect an electromotive force change corresponding to a change of infrared rays incident from a detection object as a temperature change.

The infrared rays temperature sensor 70 includes a driver seat side detection portion 71 (right seat side detection portion) and an assistant seat side detection portion 72 (left seat side detection portion), which are respectively provided with the plural detection elements that are arranged in predetermined shapes.

Figure 3:
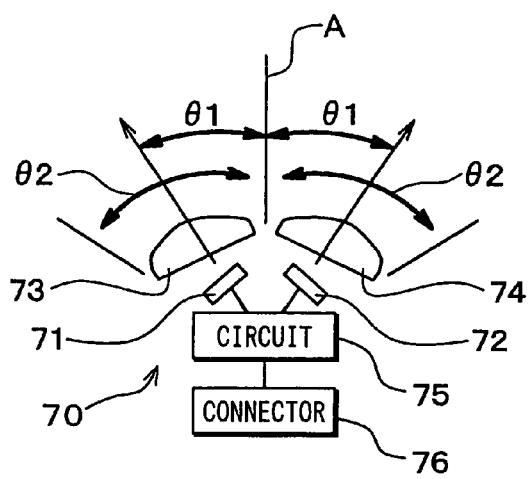
FIG. 3 is a schematic diagram showing an infrared rays temperature sensor according to the first embodiment.

As shown in FIG. 3, infrared rays, radiated from the detecting object of the front right air conditioning zone 1a and the rear right air conditioning zone 1c, enter to the driver seat side detection portion 71 through a right lens 73. Similarly, infrared rays, radiated from the detecting object of the front left air conditioning zone 1b and the rear left air conditioning zone 1d, enter to the assistant seat side detection portion 72 through a left lens 74.

In this case, the driver seat side detection portion 71 and the right lens 73 are arranged to be tilted to a right outside by a predetermined angle $\theta 1$ relative to the center line A of FIG. 3 perpendicular to the vehicle right-left direction. Similarly, the assistant seat side detection portion 72 and the left lens 74 are arranged to be tilted to a left outside by the predetermined angle $\theta 1$ relative to the center line A of FIG. 3 perpendicular to the vehicle right-left direction. Accordingly, the infrared rays, radiated form a vehicle rear portion with respect to the driver seat side front portion, enter the driver seat side detection portion 71 in a predetermined range of $\theta 2$ (e.g., $\theta 2 = 2 \times \theta 1$), for example, approximately 85°. Similarly, the infrared rays, radiated form a vehicle rear portion with respect to the assistant seat side front portion, enter the assistant seat side detection portion 72 in the predetermined range of $\theta 2$, for example, approximately 85°.

The lens 73 and 74 are made of a material with a high infrared rays transmittance respectively.

Each of the plural detection elements, for constructing the driver seat side detection portion 71 and the assistant seat side detection portion 72, includes an infrared ray absorbing film and a thermoelectric couple portion. The infrared ray absorbing film absorbs infrared rays radiated through the lens 73 and 74 from a detecting object, and converts it to heat. The thermoelectric couple portion converts heat generated from the infrared ray absorbing film to electric voltage (i.e., electric energy).

As shown in FIG. 3, electrical signals generated from the detection elements of the driver seat side detection portion 71 and the assistant seat side detection portion 72 are input to an electrical circuit 75. The electrical circuit 75 is connected to the input side of the air conditioning ECU 8 through a connector 76.

Figure 4:
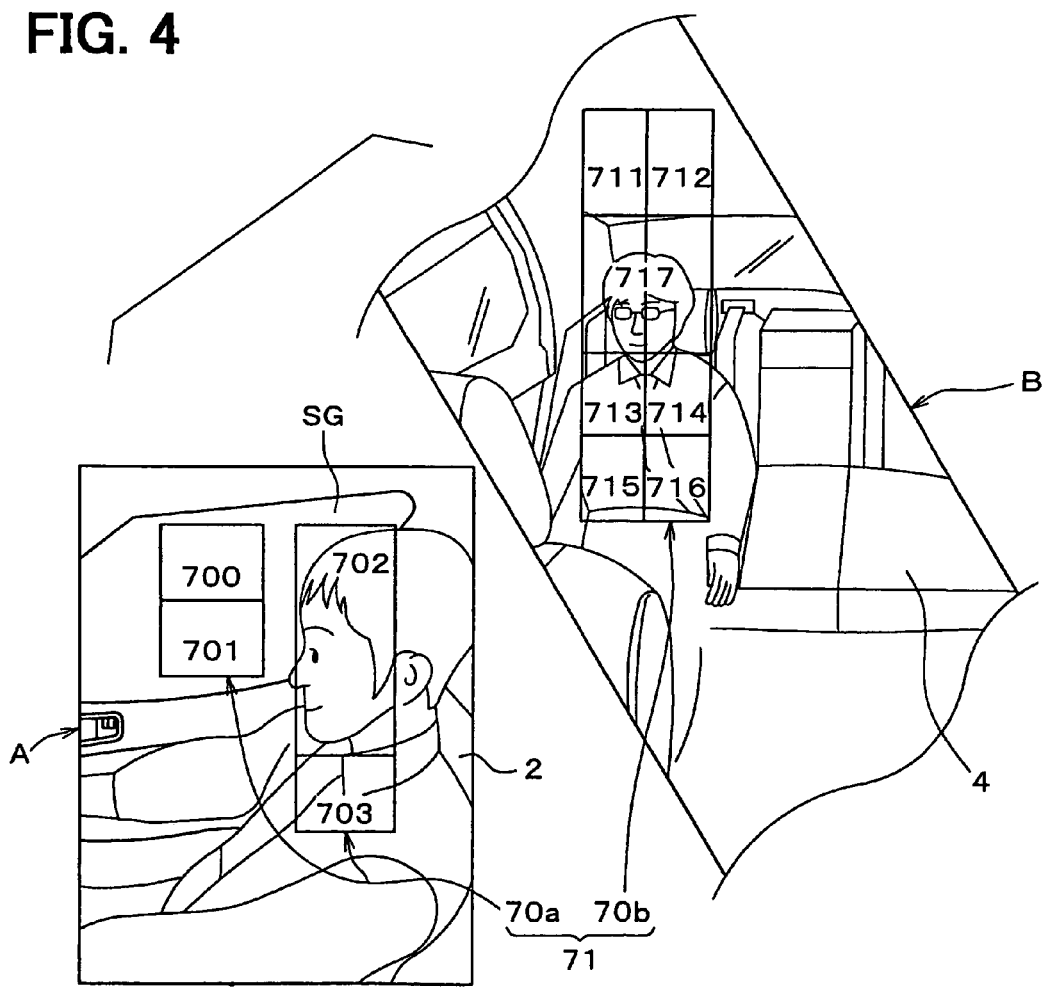
FIG. 4 is a view showing a driver seat side detection portion of the infrared rays temperature sensor according to the first embodiment.

FIG. 4 shows driver seat side detection portions A and B of the driver seat side detection portion 71. A in FIG. 4 indicates a shape of an infrared rays receiving portion 70a of the driver seat side detection portion 71 at a side of the driver's seat 2 when being viewed from the side of a front windows glass. The infrared rays receiving portion 70a includes the detection elements 700-703. A detection object of the detection elements 700 and 701 is a side window glass SG at the side of the driver's seat 2. The detection elements 700 and 701 are arranged in a line in the vertical direction to correspond to a shape of the side window glass SG (i.e., detection object) of the side of the driver's seat 2.

In this embodiment, the infrared rays receiving portion includes the thermoelectric couple portion and the infrared ray absorbing film which is positioned on the thermoelectric couple portion.

A detection object of the detection element 702 is a face skin of the driver, and the detection element 702 is arranged in a shape corresponding to a skin area exposed on the driver face (i.e., area except for glasses, mustache, hair, etc.), which is simplified as a quadrilateral as shown in FIG. 4A. A detection object of the detection element 703 is an upper-side clothes portion of the driver, and the detection element 703 is arranged in a shape corresponding to that of the upper side clothes portion of the driver.

B in FIG. 4 indicates a shape of an infrared rays receiving portion 70b of the detection portion 71 at a right side of the rear seat 4, when being viewed from the side of the front windows glass. The infrared rays receiving portion 70b includes detection elements 711-716. A detection object of the detection elements 711 and 712 is a trim panel of the passenger compartment 1 at the right side of the rear seat 4 (i.e., trim panel of ceiling portion above rear windows glass). Therefore, the detection elements 711 and 712 are arranged in a line in a vehicle width direction to correspond to a shape of the trim panel on the rear right side.

A detection object of the detection elements 713-716 is an upper-side clothes portion of the passenger at the right side of the rear seat 4. Therefore, the detection elements 713-716 are arranged in a shape corresponding to that of the clothes portion of the passenger. A detection object of the detection element 717 is a face skin area of the passenger at the right side of the rear seat 4. Therefore, the detection element 717 is arranged in a shape corresponding to the skin area exposed on the passenger face (i.e., area except for glasses, mustache, hair, etc.), which is simplified as a quadrilateral in FIG. 4.

Similarly to that of the driver seat side detection portion 71, the assistant seat side detection portion 72 includes detection elements 700-703, 711-717 (not shown). The detection elements 700-703, 711-717 of the assistant seat side detection portion 72 are arranged right-left symmetrically to the detection elements 700-703, 711-717 of the driver seat side detection portion 71.

That is, in the assistant seat side detection portion 72, the detection elements 700 and 701 are arranged in a line in the vertical direction to correspond to a shape of the side window glass SG (i.e., detection object) of the assistant seat side. The detection element 702 is arranged in a shape corresponding to that of a skin area exposed on the face of the passenger at the front side assistant seat. The detection element 703 is arranged in a shape corresponding to that of the clothes portion of the passenger at the front side assistant seat. The detection elements 711 and 712 are arranged in a line in the vehicle width direction to correspond to a shape of a trim panel at a left side of the rear seat 4. The detection elements 713-716 are arranged in a shape corresponding to that of a clothes portion of the passenger at the left side of the rear seat 4. The detection element 717 is arranged in a shape corresponding to a skin area exposed on a face (i.e., area except for glasses, mustache, hair, etc.) of the passenger at the left side of the rear seat 4.

The operation of this embodiment will next be described with reference to FIGS. 5 to 9.

When an ignition switch is turned on, electric power is supplied to the air conditioning ECU 8. When the electrical power is supplied to the air conditioning ECU 8, the microcomputer of the air conditioning ECU 8 executes a computer program stored in the memory in accordance with flow charts shown in FIG. 5, which show front and rear automatic air conditioning controls of the air conditioning ECU 8. The execution of this computer program is generally started when the ignition switch is turned on.

First, the front air conditioning control will be now described.

Figure 5:
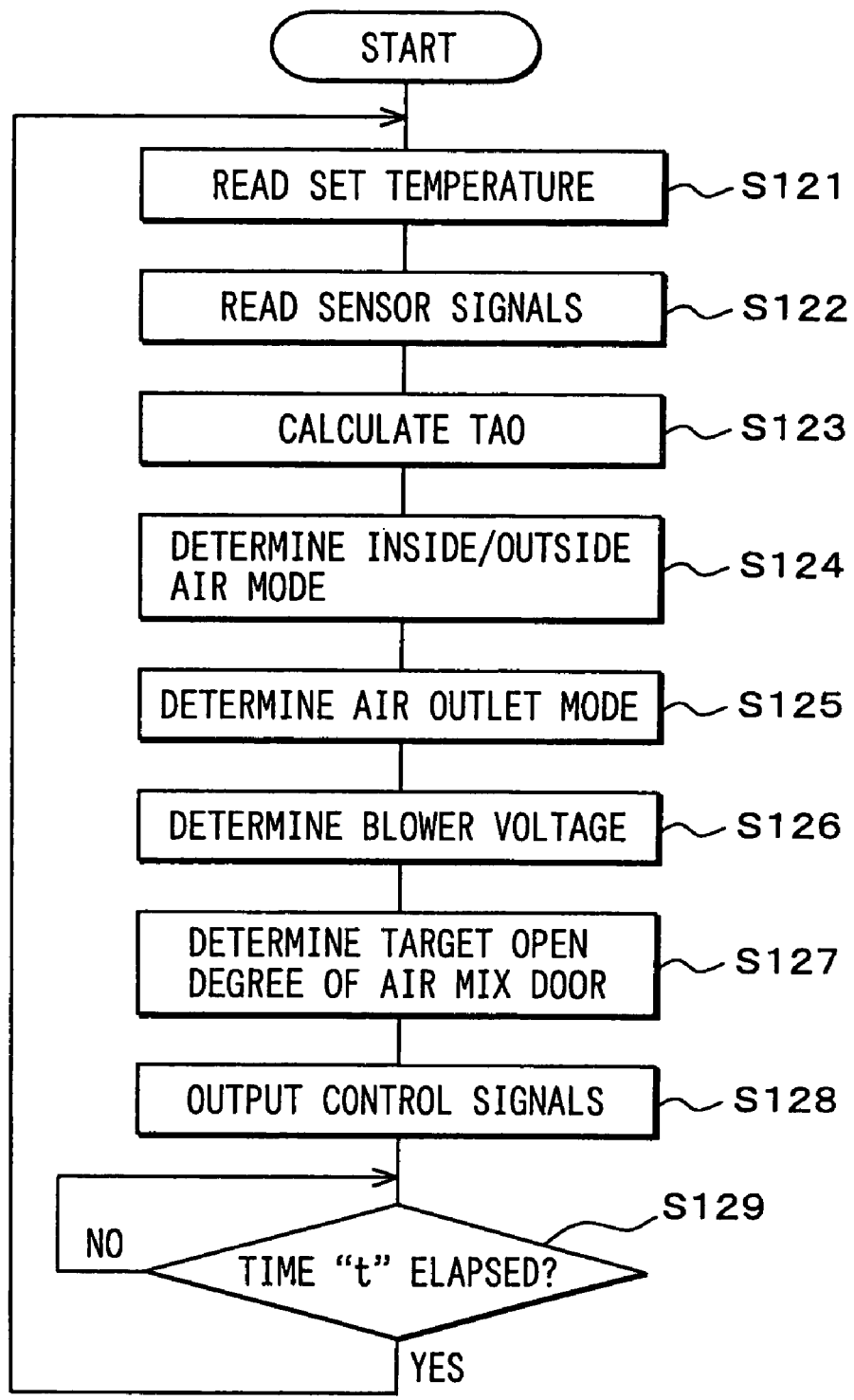
FIG. 5 is a flow diagram for performing a front air conditioning control or a rear air conditioning control of an air conditioning controller according to the first embodiment.

At step S121 shown in FIG. 5, front right and left set temperature signals TsetFrDr, TsetFrPa are input from the temperature setting switch 9, 10. Then, at step S122, an outside air temperature signal Tam from the outside air temperature sensor 81, solar radiation signals TsDr, TsPa from the right side and the left side solar radiation sensors 83a, 83b and an front seat side inside air temperature signal TrFr from the front seat side inside air temperature sensor 84 are input. Moreover, detected signals from the driver seat side detection portion 71 and the assistant seat side detection portion 72 are inputted which are described later.

Next, at step S123, a target blowing-out temperature TAOFrDr of air to be blown out to the air conditioning zone 1a in the passenger compartment is calculated in accordance with the formula (1) by using the set temperature signal TsetFrDr set by the switcher 10 of the driver seat side, the outside air temperature signal Tam detected by the outside air temperature sensor 81, the solar radiation signal TsDr and the inside air temperature signal TrFr. The target blowing-out temperature TAOFrDr is a necessary target temperature for maintaining the temperature of the front right air conditioning zone 1a (driver's seat air conditioning zone) at the set temperature TsetFrDr regardless of an environment temperature of the vehicle.

$$TAOFrDr = KsetFrDr \times TsetFrDr - Kir \times FrDrTir - KrFr \times TrFr - KsFr \times TsDr - Kam \times Tam + CFrDr \quad (1)$$

wherein, KsetFrDr, Kir, KrFr, KsFr, Kam are control gains (i.e., coefficients), and CFrDr is a constant. FrDrTir is a surface temperature of the driver at the right side front seat, and is determined by the detected temperature of the infrared rays receiving portion 70a of the detection portion 71. Specifically, FrDrTir is calculated according to the formula (1-1) by using detected temperature signals Ta2, Ta3 of the detection elements 702, 703 and coefficients K1, K2.

$$FrDrTir = (Ta2 \times K1 + Ta3 \times K2)/2 \quad (1\text{-}1)$$

Further, at the step S123, a target blowing-out temperature TAOFrPa of air blown out to the air conditioning zone 1b in the passenger compartment is calculated in accordance with the formula (2) by using the set temperature signal TsetFrPa, the outside air temperature signal Tam, the solar radiation signal TsPa and the inside air temperature signal TrFr. The target blowing-out temperature TAOFrPa is a necessary target temperature for maintaining the temperature of the front left air conditioning zone 1b (assistant's seat air conditioning zone) at the set temperature TsetFrPa.

$$TAOFrPa = KsetFrPa \times TsetFrPa - Kir \times FrPaTir - KrFr \times TrFr - KsFr \times TsPa - Kam \times Tam + CFrPa \quad (2)$$

wherein, KsetFrPa, Kir, KrFr, KsFr, Kam are control gains (i.e., coefficients), and CFrPa is a constant. FrPaTir is a surface temperature of the driver at the left side front seat, and is determined by the detected temperature of the infrared rays receiving portion 70a of the detection portion 72. Specifically, FrPaTir is calculated according to the formula (2-1) by using detected temperature signals Ta02, Ta03 of the detection elements 702, 703 and coefficients K1, K2.

$$FrPaTir=(Ta02 \times K1+Ta03 \times K2)/2 \quad (2\text{-}1)$$

Figure 6:
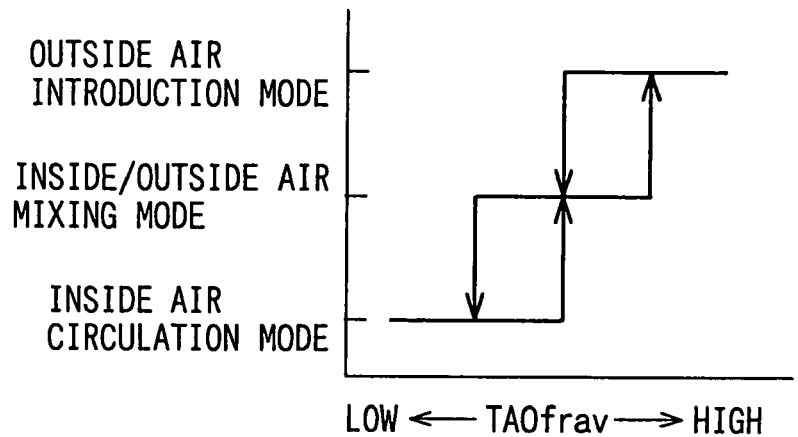
FIG. 6 is a graph showing a control map for determining an inside/outside air mode in the front air conditioning control in FIG. 5.

Next, at step S124, one of an inside air circulation mode, an inside-outside air mixing mode and an outside air introduction mode are selected as an inside/outside air mode based on the control map shown in FIG. 6, in accordance with an average front target blowing-out temperature TAOfrav. The average front target blowing-out temperature TAOfrav is an average value of the TAOFrPa and TAOFrDr. When the average front target blowing-out temperature TAOfrav is lower than a low predetermined temperature, the inside/outside air mode is selected to be the inside air circulation mode in which only inside air is circulated. When the average front target blowing-out temperature TAOfrav is higher than a high predetermined temperature, the inside/outside air mode is selected to be the outside air introduction mode in which only outside air is introduced. When the average front target blowing-out temperature TAOfrav is in a middle temperature range between the low predetermined temperature and the high predetermined temperature, the inside/outside air mode is selected to be the inside-outside air mixing mode in which both the outside air and the inside air are introduced.

Figure 7:
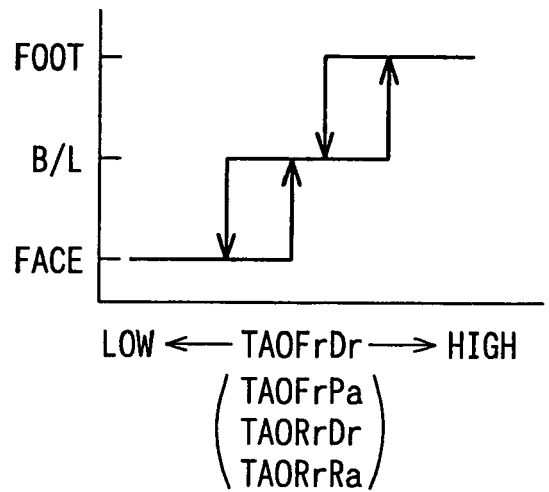
FIG. 7 is a graph showing a control map for determining an air outlet mode in the front or rear air conditioning control in FIG. 5.

Next, at step S125, an air outlet mode for the front right air conditioning zone 1a and an air outlet mode for the front left air conditioning zone 1b are independently determined in accordance with the graph in FIG. 7 based on the target blowing-out temperatures TAOFrDr and TAOFrPa, respectively. As shown in FIG. 7, the air outlet mode for the air conditioning zone 1a is automatically changed in this order of a face mode (FACE), a bi-level mode (B/L) and a foot mode (FOOT) as the target blowing-out temperature TAOFrDr increases. Similarly, the air outlet mode for the air conditioning zone 1b is automatically changed in this order of the face mode (FACE), the bi-level mode (B/L) and the foot mode (FOOT) as the target blowing-out temperature TAOFrPa increases.

In the face mode, conditioned air is blown only from the face blowing-out port 56a (56b) toward an upper side of a passenger on the front seat in the passenger compartment. In the foot mode, the foot blowing-out port is fully opened so that conditioned air is blown toward a lower side of the passenger only from the foot blowing-out port. Further, in the bi-level mode, conditioned air is blown to both the lower side and the upper side of the passenger from both the face blowing-out port 56a (56b) and the foot blowing-out port.

Figure 8:
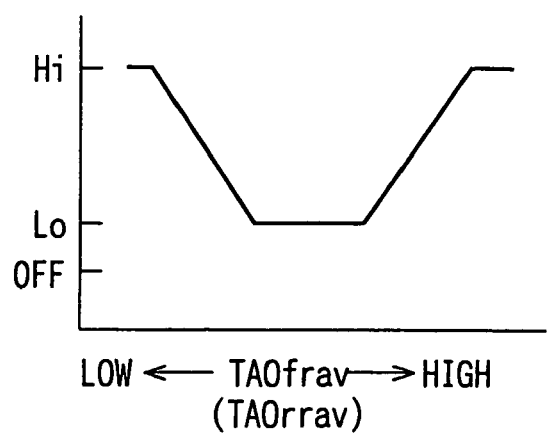
FIG. 8 is a graph showing a control map for determining a blower voltage in the front or rear air conditioning control in FIG. 5.

Next, at step S126, a blower voltage applied to the blower motor 52a is determined in accordance with the control map shown in FIG. 8, based on the average front target blowing-out temperature TAOfrav which is the average value of the TAOFrDr and the TAOFrPa.

As shown in FIG. 8, when the average front target blowing-out temperature TAOfrav is in a middle temperature area between low and high predetermined temperatures, the blower voltage is set at a constant low value, so that the air amount blown from the blower 52a is set at a constant low amount. When the average front target blowing-out temperature TAOfrav is lower than the lower predetermined temperature or higher than the high predetermined temperature, the blower voltage is set larger than the constant low value, so that the air amount blown from the blower 52a is increased.

Next, at step S127, target open degrees SWFrDr, SWFrPa of the air mix doors 55a, 55b are calculated in accordance with formula (3) and formula (4).

$$SWFrDr=[(TAOFrDr-TeFr)/(Tw-TeFr)] \times 100(\%) \quad (3)$$

$$SWFrPa=[(TAOFrPa-TeFr)/(Tw-TeFr)] \times 100(\%) \quad (4)$$

In the formulas (3) and (4), TeFr is an evaporator air temperature detected by the evaporator temperature sensor 86, and Tw is a water temperature detected by the water temperature sensor 82. When SWFrDr=0% and SWFrPa=0%, the air mix doors 55a, 55b are operated at the maximum cooling position so that all air after passing through the front evaporator 53 in the air passages 50c, 50d flows through the bypass passages 50e, 50f. In contrast, when SWFrDr=100% and SWFrPa=100%, the air mix doors 55a, 55b are operated at the maximum heating position so that all air after passing through the front evaporator 53 in the air passages 50c, 50d flows through the heater core 54.

Then, at step S128, the control signals of the blower voltage, the target open degrees SWFrDr, SWFrPa, the inside/outside air mode and the air outlet mode determined above are output to the servomotors 51a, 550a, 550b, 56e and 56f and the blower motor 52a, so as to control operation of the inside/outside air switching door 51, the air mix doors 55a, 55b, the air outlet mode switching doors 56c, 56d and the blower 52.

After a predetermined time "t" passes at step S129, the control program returns to step S121, and the automatic control of the air conditioning zones 1a, 1b are performed by repeating the above control operation.

Next, as shown in FIG. 5, a rear air conditioning control will be described in which a control similar to the front air conditioning control is simplified.

At step S121 in FIG. 5, rear right and left set temperature signals TsetRrDr, TsetRrPa from the temperature setting switch 11, 12 are input. Then, at step S122, various kinds of sensor signals are input.

Figure 9:
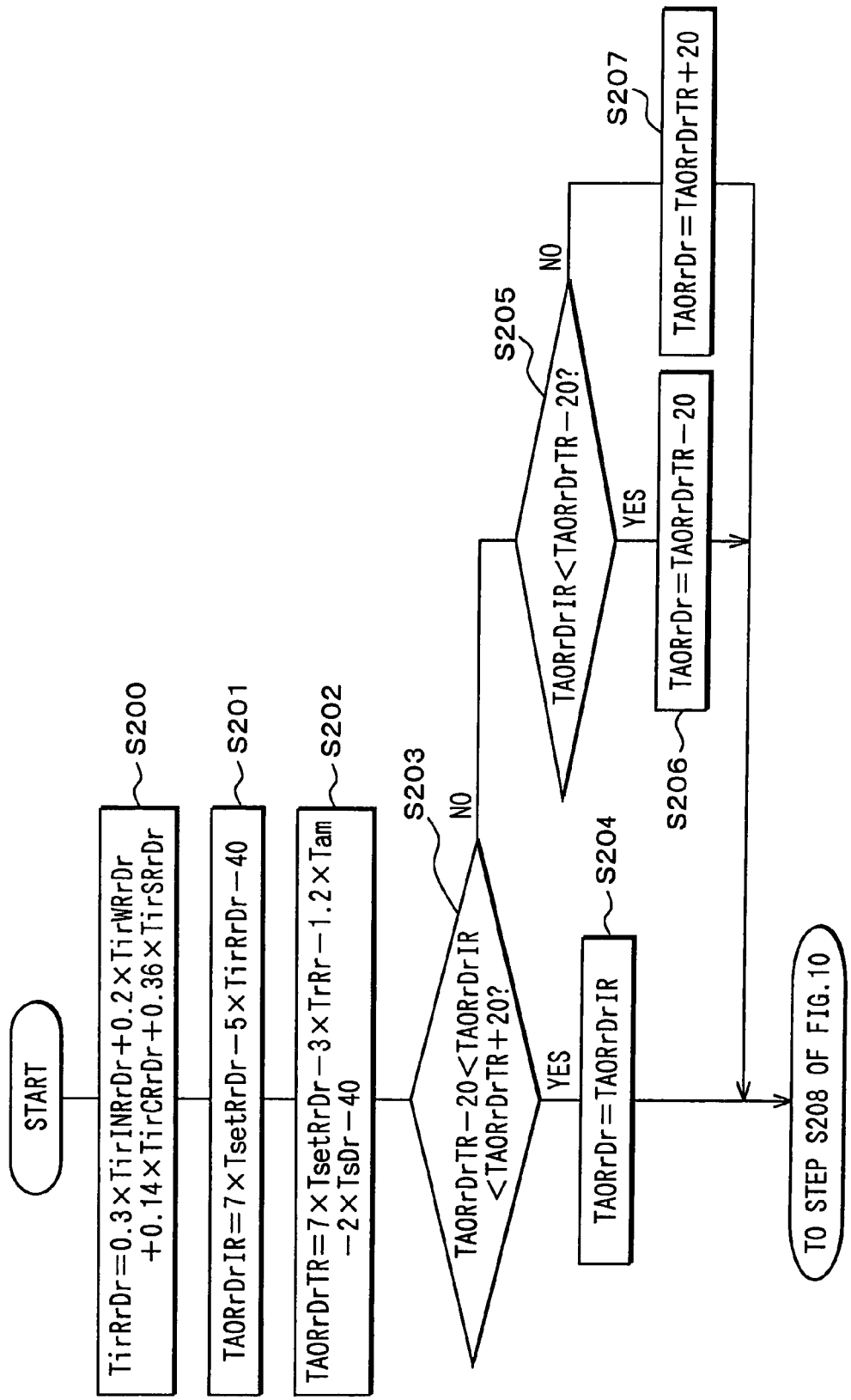
FIG. 9 is a flow chart for calculating a target blowing-out temperature of air blown out to a right rear side seat in the air conditioning control in FIG. 5 according to the first embodiment.

Next, at step S123, a target blowing-out temperature TAORrDr of air blown out to the air conditioning zone 1c in the passenger compartment is calculated in accordance with control shown in FIG. 9. The target blowing-out temperature TAORrDr is a necessary target temperature for maintaining the temperature of the rear right air conditioning zone 1c at the set temperature TsetRrDr.

At step S200 in FIG. 9, a rear right temperature TirRrDr is firstly calculated in accordance with the following formula (5) by using a rear right trim panel temperature TirINRrDr, a rear right window surface temperature TirWRrDr, a rear right passenger's clothes temperature TirCRrDr and a rear right passenger's skin temperature TirSRrDr. As shown in the formula (5), relative to the parameters TirINRrDr, TirWRrDr, TirCRrDr and TirSRrDr, weightings 0.3, 0.2, 0.14 and 0.36 are added, respectively. The rear right TirRrDr is calculated as following.

$$TirRrDr=0.3 \times TirINRrDr+0.2 \times TirWRrDr+0.14 \times TirCRrDr+0.36 \times TirSRrDr \quad (5)$$

Further, the rear right trim panel temperature TirINRrDr, the rear right window surface temperature TirWRrDr, and the rear right passenger's clothes temperature TirCRrDr in the formula (5), which are affected by the interior air, the exterior air and solar radiation, are calculated by using average calculations shown in formulas (5-1), (5-2), and (5-3). The rear right passenger's skin temperature TirSRrDr is determined to be the detected temperature Ta17 of the detection element 717 of the driver seat side detection portion 71.

$$TirINRrDr=(Ta11+Ta12)/2 \quad (5\text{-}1)$$

$$TirWRrDr=(Ta00+Ta01)/2 \quad (5\text{-}2)$$

$$TirCRrDr=(Ta13+Ta14+Ta15+Ta16)/4 \quad (5\text{-}3)$$

In the formulas (5-1), (5-2) and (5-3), Ta11, Ta12, Ta00, Ta01, Ta13, Ta14, Ta15 and Ta16 are respectively detected temperatures of the detection elements 711, 712, 700, 701, 713, 714, 715 and 716 of the driver seat side detection portion 71.

Next, at step S201, a rear right target blowing-out temperature TAORrDrIR of air blown out to the air conditioning zone 1c in the passenger compartment is calculated in accordance with the formula (6) by using the set temperature signal TsetRrDr set by the rear right temperature setting switch 11. The rear right target blowing-out temperature TAORrDrIR is a necessary target temperature for maintaining the temperature of the rear right air conditioning zone 1c at the set temperature TsetRrDr. TAORrDrIR is a first air-conditioning control value in this embodiment.

$$TAORrDrIR=7\times TsetRrDr-5\times TirRrDr-40 \quad (6)$$

wherein, "7" and "5" are temperature setting gains (parameters), and "40" is a correction constant.

At step S202, the rear inside air temperature signal TrRr at the rear seat side is used instead of the rear right temperature TirRrDr to calculate a rear right target blowing-out temperature TAORrDrTR in accordance with the formula (7). TAORrDrTR is a second air-conditioning control value in this embodiment.

$$TAORrDrTR=7\times TsetRrDr-3\times TrRr-1.2\times Tam-2\times TsDr-40 \quad (7)$$

wherein, the set temperature signal TsetRrDr is set by the rear right temperature setting switch 11 which is the same with that in the formula (6), Tam is the outside air temperature signal and TsDr is the solar radiation signal. Furthermore, "7", "−3", "−1.2" and "−2" are temperature setting gains (parameters), and "40" is a correction constant.

As compared with TAORrDrIR, TAORrDrTR is calculated without using the passenger's skin temperature TirSRrDr. That is, a contribution degree TIR of the passenger's skin temperature TirSRrDr to the calculation of TAORrDrTR is set smaller than a contribution degree YIR of that to the calculation of TAORrDrIR.

For example, the contribution degree YIR is the parameter "5" of TirRrDr which is used in the calculation of TAORrDrIR. The contribution degree TIR is a parameter "0" of TirRrDr which is used in the calculation of TAORrDrTR. The parameter of TirRrDr used in the calculation of TAORrDrTR can also be set at other value smaller than the contribution degree YIR.

At step S203, it is determined whether an obstacle having an abnormal temperature exists between the detection element 717 and the passenger's face at the right side of the rear seat 4 or not, based on TAORrDrTR and TAORrDrIR. If an abnormal temperature obstacle is placed between the detection element 717 and the rear right side passenger's face, the detected temperature Ta17 of the detection element 717 is influenced so that the target blowing-out temperature TAORrDrIR is affected by the surface temperature of the obstacle. In contrast, the target blowing-out temperature TAORrDrTR is calculated by using the rear inside air temperature signal at the rear seat side, and thereby being affected by the obstacle less than TAORrDrIR.

Therefore, TAORrDrIR is largely different from TAORrDrTR when an abnormal temperature obstacle exists. Accordingly, by determining whether a difference between TAORrDrIR and TAORrDrTR is larger than a set value (e.g., 20° C.) or not, it can be determined whether an obstacle with an abnormal temperature exists between the detection element 717 and the rear right side passenger's face or not.

When the difference (|TAORrDrIR−TAORrDrTR|) between TAORrDrIR and TAORrDrTR is smaller than a set value (e.g., 20° C.), that is, when (TAORrDrTR−20)<TAORrDrIR<(TAORrDrTR+20), it is determined that an obstacle with an abnormal temperature does not exist, and YES is determined at step S203. Thus, at step S204, TAORrDrIR is used as a normal rear right target blowing-out temperature and the value of TAORrDrIR is set as TAORrDr.

On the other hand, when the difference between TAORrDrIR and TAORrDrTR is equal to or larger than the set value (e.g., 20° C.), that is, when (TAORrDrTR−20)≧TAORrDrIR, or TAORrDrIR ≧(TAORrDrTR+20), it is determined that an obstacle having an abnormal temperature exists between the detection element 717 and the rear right side passenger's face, and No is determined in step S203. Thus, step S205 will be performed.

At step S205, when TAORrDrIR is smaller than TAORrDrTR and the difference between them is larger than the set value (e.g., 20° C.), that is, when (TAORrDrTR−20)>TAORrDrIR, it is determined that an abnormally low temperature obstacle (e.g., ice cream) exists between the detection element 717 and the rear right side passenger's face, and YES is determined at step S205. Because TAORrDrIR is readily affected by a surface temperature of the abnormally low temperature obstacle, a corrected air-conditioning control value is calculated by subtracting the set value (e.g., 20° C.) from TAORrDrTR. The corrected air-conditioning control value (i.e., TAORrDrTR−20) is set as the TAORrDr at step S206.

On the other hand, when it is determined that TAORrDrIR is larger than TAORrDrTR and the difference between them is larger than the set value, that is, when TAORrDrIR≧(TAORrDrTR+20), NO is determined at step S205. Thus, it is determined that an abnormally high temperature obstacle (e.g., fired cigarette) exists between the detection element 717 and the rear right side passenger's face. In this case, a corrected air-conditioning control value is calculated by adding the set value (e.g., 20° C.) to TAORrDrTR. The corrected air-conditioning control value (i.e., TAORrDrIR+20) is set as the value of TAORrDr at step S207.

According to the steps S200-S207 shown in FIG. 9, the target blowing-out temperature TAORrDr of air blown out to the air conditioning zone 1c in the passenger compartment is calculated.

Figure 10:
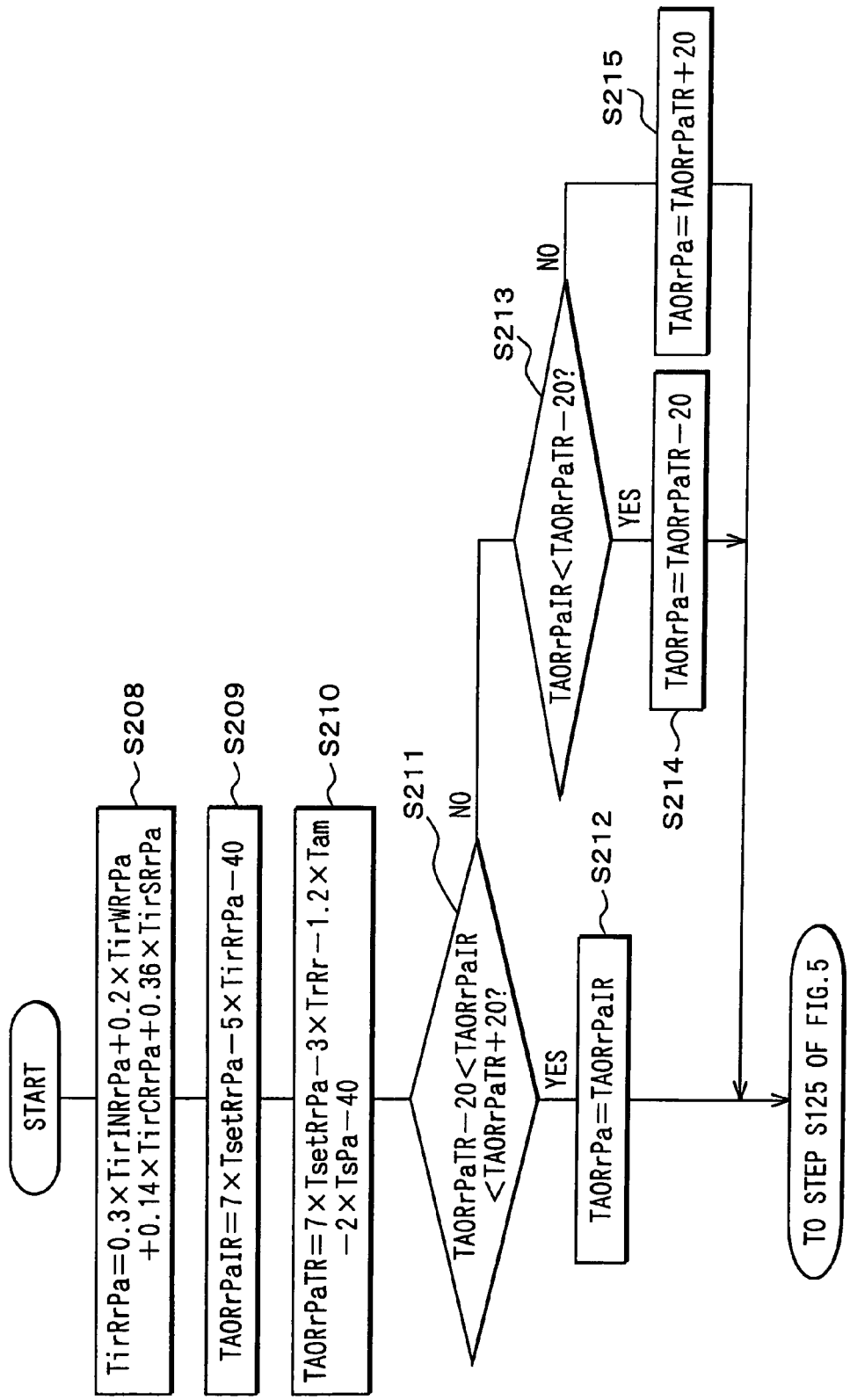
FIG. 10 is a flow chart for calculating a target blowing-out temperature of air blown out to a left rear side seat in the air conditioning control in FIG. 5 according to the first embodiment.

Furthermore, at step S123 shown in FIG. 5, a target blowing-out temperature TAORrPa of air blown out to the air conditioning zone 1d in the passenger compartment is calculated in accordance with control shown in FIG. 10. The target blowing-out temperature TAORrPa is a necessary target temperature for maintaining the temperature of the rear left air conditioning zone 1d at the set temperature TsetRrPa.

Here, the calculation of TAORrPa is substantially similar to that of TAORrDr except for the detected temperatures of the detection elements of the assistant seat side detection portion 72 which are used in the calculation of TAORrPa. As described above, in the case of TAORrDr, the detected temperatures of the detection elements of the driver seat side detection portion 71 are used. Accordingly, the calculation of the target blowing-out temperature TAORrPa is simply described in following.

At step S208 in FIG. 10, a rear left temperature TirRrPa is firstly calculated in accordance with the following formula (8) by using a rear left trim panel temperature TirINRrPa, a rear left window surface temperature TirWRrPa, a rear left passenger's clothes temperature TirCRrPa and a rear left passenger's skin temperature TirSRrPa.

$$TirRrPa = 0.3 \times TirINRrPa + 0.2 \times TirWRrPa + 0.14 \times TirCRrPa + 0.36 \times TirSRrPa \quad (8)$$

Further, the rear left trim panel temperature TirINRrPa, the rear left window surface temperature TirWRrPa, and the rear left passenger's clothes temperature TirCRrPa in the formula (8) are calculated by using average calculations shown in formulas (8-1), (8-2), and (8-3). The rear left passenger's skin temperature TirSRrPa is set as the detected temperature Ta17 of the detection element 717 of the driver seat side detection portion 72.

$$TirINRrPa = (Ta11 + Ta12)/2 \quad (8\text{-}1)$$

$$TirWRrPa = (Ta00 + Ta01)/2 \quad (8\text{-}2)$$

$$TirCRrPa = (Ta13 + Ta14 + Ta15 + Ta16)/4 \quad (8\text{-}3)$$

In the formulas (8-1), (8-2) and (8-3), Ta11, Ta12, Ta00, Ta01, Ta13, Ta14, Ta15 and Ta16 are respectively detected temperatures of the detection elements 711, 712, 700, 701, 713, 714, 715 and 716 of the assistant seat side detection portion 72.

Next, at step S209, a rear left target blowing-out temperature TAORrPaIR of air blown out to the air conditioning zone 1d in the passenger compartment is calculated in accordance with the formula (9) by using the set temperature signal TsetRrPa set by the rear left temperature setting switch 12. The rear left target blowing-out temperature TAORrPaIR is a necessary target temperature for maintaining the temperature of the rear left air conditioning zone 1d at the set temperature TsetRrPa.

$$TAORrPaIR = 7 \times TsetRrPa - 5 \times TirRrPa - 40 \quad (9)$$

wherein, "7" and "5" are temperature setting gains (parameters), and "40" is a correction constant.

At step S210, the rear inside air temperature signal TrRr is used instead of the rear left temperature TirRrPa to calculate a rear left target blowing-out temperature TAORrPaTR in accordance with the formula (10).

$$TAORrPaTR = 7 \times TsetRrPa - 3 \times TrRr - 1.2 \times Tam - 2 \times TsPa - 40 \quad (10)$$

wherein, the set temperature signal TsetRrPa is set by the rear left temperature setting switch 12 which is the same with that in the formula (9). Furthermore, "7", "-3", "-1.2" and "-2" are temperature setting gains (parameters), and "40" is a correction constant.

As compared with TAORrPaIR, TAORrPaTR is calculated without using the passenger's skin temperature TirSRrPa. That is, the passenger's skin temperature TirSRrPa dose not contribute to the calculation of TAORrPaTR.

At step S211, it is determined whether an obstacle with an abnormal temperature exists between the detection element 717 and the passenger's face at the left side of the rear seat 4 or not, according to TAORrPaTR and TAORrPaIR.

When the difference (|TAORrPaIR−TAORrPaTR|) between TAORrPaIR and TAORrPaTR is smaller than a set value (e.g., 20° C.), that is, when (TAORrPaTR−20)<TAORrPaIR<(TAORrPaTR+20), it is determined that an obstacle with an abnormal temperature does not exist, and YES is determined at step S211. Thus, at step S212, TAORrPaIR is used as a normal rear left target blowing-out temperature and the value of TAORrPaIR is set as TAORrPa.

On the other hand, when TAORrPaIR is smaller than TAORrPaTR and the difference between them is equal to or larger than the set value (e.g., 20° C.), that is, when (TAORrPaTR−20)≧TAORrPaIR, it is determined that an abnormally low temperature obstacle (e.g., ice cream) exists between the detection element 717 and the rear left side passenger's face, and YES is determined at step S213. In this case, a corrected target blowing-out temperature is calculated by subtracting the set value (e.g., 20° C.) from TAORrPaTR. Thus, the corrected air-conditioning control value (i.e., TAORrPaTR−20) is set as TAORrPa at step S214.

On the other hand, when it is determined that TAORrPaIR is larger than TAORrPaTR and the difference between them is larger than the set value, that is, when TAORrPaIR≧(TAORrPaTR+20), NO is determined at step S213. Thus, it is determined that an abnormally high temperature obstacle (e.g., fired cigarette) exists between the detection element 717 and the rear left side passenger's face. In this case, a corrected air-conditioning control value is calculated by adding the set value to TAORrPaTR. The corrected air-conditioning control value (i.e., TAORrPaTR+20) is set as TAORrPa at step S215.

According to the steps S208-S215 shown in FIGS. 10, the target blowing-out temperature TAORrPa of air blown out to the air conditioning zone 1d in the passenger compartment is calculated. Thus, the step S123 shown in FIG. 5 is ended.

Next, because the inside/outside air mode is selected only in the front side as shown at step S124 in FIG. 5, step S124 is not performed at the rear air conditioning control. At step S125 in FIG. 5, similarly to that of the front seat side, the air outlet mode of the rear seat side is determined based on the above-described TAORrDr and TAORrPa, and is not described here.

Next, similarly to that of the front seat side, at step S126, a blower voltage applied to the blower motor 62a is determined based on the average rear target blowing-out temperature TAOrrav that is the average value between the TAORrDr and the TAORrPa, and is not described here.

Next, at step S127, target open degrees SWRrDr, SWRrPa of the air mix doors 65a, 65b are calculated in accordance with formula (11) and formula (12).

$$SWRrDr = [(TAORrDr - TeRr)/(Tw - TeRr)] \times 100(\%) \quad (11)$$

$$SWRrPa = [(TAORrPa - TeRr)/(Tw - TeRr)] \times 100(\%) \quad (12)$$

In the formulas (11) and (12), TeRr is an evaporator air temperature detected by the evaporator temperature sensor 87, and Tw is a water temperature detected by the water temperature sensor 82. When SWRrDr=0% and SWRrPa=0%, the air mix doors 65a, 65b are operated at the maximum cooling position so that all air after passing through the rear evaporator 63 in the air passages 60c, 60d flows through the bypass passages 60e, 60f. In contrast, when SWRrDr=100% and SWRrPa=100%, the air mix doors 65a, 65b are operated at the maximum heating position so that all air after passing through the rear evaporator 63 in the air passages 60c, 60d flows through the heater core 64.

Then, at step S128, the control signals of the blower voltage, the target open degrees SWRrDr, SWRrPa, and the rear air outlet mode determined above are output to the servomotors 650a, 650b, 660c, 660d and the blower motor 62a, so as to control operation of the air mix doors 65a, 65b, the air outlet mode switching doors 66c, 66d and the blower 62.

After a predetermined time "t" passes at step S129 in FIG. 5, the control program returns to step S121, and the automatic control of the air conditioning zones 1c, 1d are performed by repeating the above control operation.

According to the above-described first embodiment, in the rear seat air conditioning unit 6, the air mix doors 65a, 65b are respectively provided in the right rear side seat and the left rear side seat. Moreover, the non-contact temperature sensor 70 can detect the face skin temperatures of the right rear passenger and the left rear passenger, respectively. In this case, the rear right target blowing-out temperature TAORrDrIR and the rear left target blowing-out temperature TAORrPaIR (first target temperature) are calculated corresponding to the right rear side seat and the left rear side seat by the air conditioning ECU 8, respectively. Moreover, the rear right target blowing-out temperature TAORrDrTR and the rear left target blowing-out temperature TAORrPaTR (second target temperature) are calculated corresponding to the right rear side seat and the left rear side seat by the air conditioning ECU 8, respectively. TAORrDrIR and TAORrPaIR are calculated according to the detected temperature Ta17 of the detection element 717 of the non-contact temperature sensor 70. TAORrDrTR and TAORrPaTR are calculated according to the detected temperature TRRr of the rear inside air temperature sensor 85.

Accordingly, when an obstacle with an abnormal temperature exists between the detection element 717 of the non-contact temperature sensor 70 and the passenger's face, the detected temperature TRRr of the rear inside air temperature sensor 85 is affected less by the temperature of the obstacle, as compared with the detected temperature Ta17 of the detection element 717. Therefore, TAORrDrTR and TAORrPaTR are influenced less by the obstacle having the abnormal temperature, than TAORrDrIR and TAORrPaIR.

On the other hand, the air conditioning ECU 8 determines whether an abnormal temperature obstacle exists between the detection element 717 and the passenger's face at the right seat and between the detection element 717 and the passenger's face at the left seat or not, respectively.

When it is determined that an abnormal temperature obstacle does not exist between the detection element 717 and the passenger's face, the open degrees of the air mix doors 65a, 65b are controlled according to the target blowing-out temperatures TAORrDrIR and TAORrPaIR, respectively.

When it is determined that an abnormal temperature obstacle exists between the detection element 717 and the passenger's face, TAORrDrTR and TAORrPaTR are respectively corrected to calculate the target blowing-out temperatures TAORrDr and TAORrPa. In this case, TAORrDrTR and TAORrPaTR are influenced less by the abnormal temperature obstacle as compared with TAORrDrIR and TAORrPaIR. Therefore, TAORrDr and TAORrPa are calculated using TAORrDrTR and TAORrPaTR, and are influenced less by the abnormal temperature obstacle than TAORrDrIR and TAORrPaIR. Because the air conditioning ECU 8 controls the rear seat air conditioning unit 6 based on the target blowing-out temperatures TAORrDr and TAORrPa, an abnormal control of the air conditioning operation due to the abnormal temperature obstacle can be restricted.

Second Embodiment

In the above-described first embodiment, the target blowing-out temperature TAORrDrTR is calculated as the second air-conditioning control value based on the rear inside air temperature. In the second embodiment, a target blowing-out temperature is calculated as the second air-conditioning control value based on the passenger's clothes temperature referring to FIGS. 11, 12. In this case, the same control with that in the first embodiment will be simplified.

Figure 11:
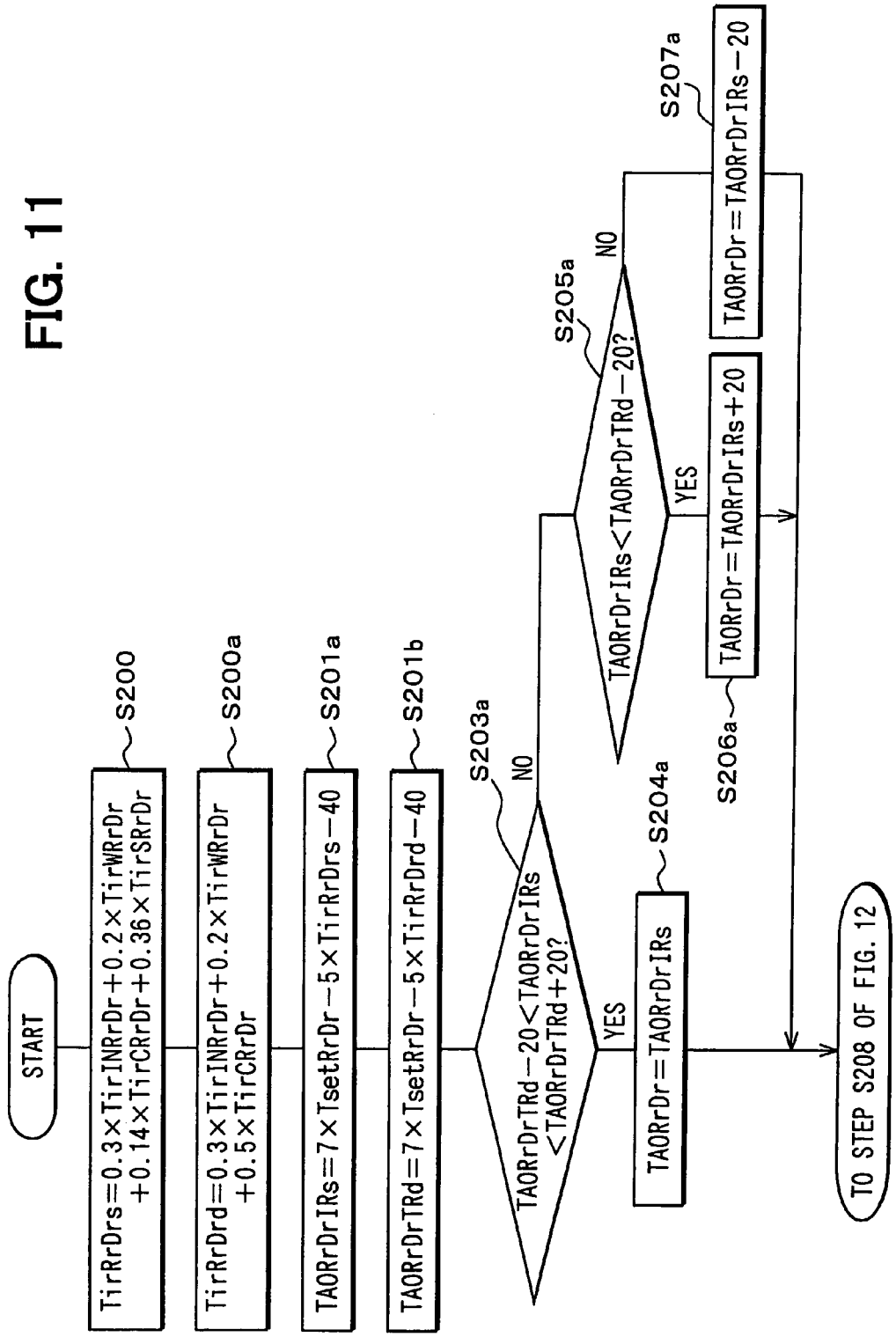
FIG. 11 is a flow chart for calculating a target blowing-out temperature of air blown out to a right rear side seat in an air conditioning control in FIG. 5 according to a second embodiment of the present invention.

At first, control operation for calculating the rear right target blowing-out temperature TAORrDr is described referring to FIG. 11.

At step S200 in FIG. 11, similarly to the first embodiment, a rear right temperature TirRrDrs is calculated in accordance with the formula (5a) by using the rear right trim panel temperature TirINRrDr, the rear right window surface temperature TirWRrDr, the rear right passenger's clothes temperature TirCRrDr and the rear right passenger's skin temperature TirSRrDr.

$$TirRrDrs = 0.3 \times TirINRrDr + 0.2 \times TirWRrDr + 0.14 \times TirCRrDr + 0.36 \times TirSRrDr \quad (5a)$$

At step S200a, a rear right temperature TirRrDrd is calculated in accordance with the following formula (13) without using the rear right passenger's skin temperature TirSRrDr, which is used in the calculation of TirRrDrs.

$$TirRrDrd = 0.3 \times TirINRrDr + 0.2 \times TirWRrDr + 0.5 \times TirCRrDr \quad (13)$$

wherein, TirINRrDr, TirWRrDr, and TirCRrDr are the same with those used in the above formula (5a). "0.3", "0.2" and "0.5" are temperature setting gains (parameters).

At step S201a, a rear right target blowing-out temperature TAORrDrIRs of air blown out to the air conditioning zone 1c in the passenger compartment is calculated in accordance with the formula (14) by using the rear right temperature TirRrDrs.

$$TAORrDrIRs = 7 \times TsetRrDr - 5 \times TirRrDrs - 40 \quad (14)$$

wherein, "7" and "5" are temperature setting gains (parameters), and "40" is a correction constant.

At step S201b, the rear right temperature TirRrDrd is used instead of the rear right temperature TirRrDrs to calculate a rear right target blowing-out temperature TAORrDrTRd in accordance with the formula (15).

$$TAORrDrTRd = 7 \times TsetRrDr - 5 \times TirRrDrd - 40 \quad (15)$$

As compared with TAORrDrIRs, TAORrDrTRd is calculated without using the rear right passenger's skin temperature TirSRrDr. That is, a contribution degree TIR of the passenger's skin temperature TirSRrDr to the calculation of TAORrDrTRd is set lower than a contribution degree YIR of that to the calculation of TAORrDrIRs.

When the difference (|TAORrDrIRs−TAORrDrTRd|) between TAORrDrIRs and TAORrDrTRd is smaller than a set value (e.g., 20° C.), that is, when (TAORrDrTRd−20) <TAORrDrIRs<(TAORrDrTRd+20), it is determined that an obstacle having an abnormal temperature does not exist, and YES is determined at step S203a. Thus, at step S204a, TAORrDrIRs is determined as a normal rear right target blowing-out temperature and the value of TAORrDrIRs is set as the rear right target blowing-out temperature TAORrDr.

On the other hand, when TAORrDrIRs is smaller than TAORrDrTRd and the difference between them is larger than the set value (e.g., 20° C.), it is determined that an abnormally low temperature obstacle (e.g., ice cream) exists between the detection element 717 and the rear right side passenger's face, and YES is determined at step S205a. Because TAORrDrIRs is affected by a surface temperature of the abnormally low temperature obstacle, the set value (e.g., 20° C.) is added to TAORrDrIRs to approach TAORrDrTRd. The corrected TAORrDrIRs (i.e., TAORrDrIRs+20) is set as TAORrDr at step S206a.

On the other hand, when it is determined that TAORrDrIRs is larger than TAORrDrTRd and the difference between them is larger than the set value, NO is determined at step S205a. Thus, it is determined that an abnormally high temperature obstacle (e.g., fired cigarette) exists between the detection element 717 and the rear right side passenger's face. Because TAORrDrIRs is affected by a surface temperature of the abnormally high temperature obstacle, the set value (e.g., 20° C.) is subtracted from TAORrDrIRs to approach TAOR-rDrTRd. The corrected TAORrDrIRs (i.e., TAORrDrIRs−20) is set as TAORrDr at step S207a.

According to the steps S200-S207a shown in FIG. 11, the target blowing-out temperature TAORrDr of air blown out to the air conditioning zone 1c in the passenger compartment is calculated.

Figure 12:
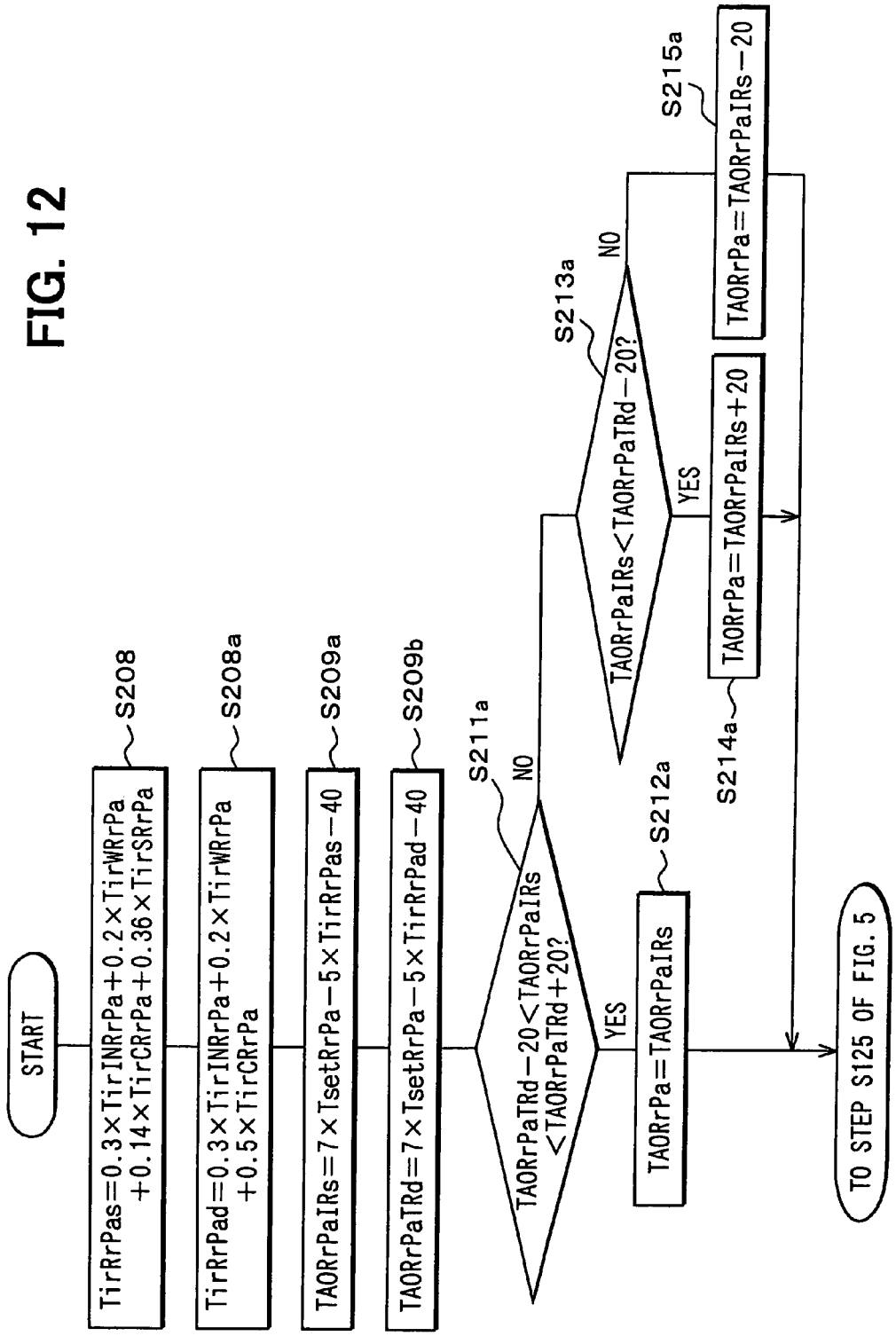
FIG. 12 is a flow chart for calculating a target blowing-out temperature of air blown out to a left rear side seat in the air conditioning control in FIG. 5 according to the second embodiment.

Next, a target blowing-out temperature TAORrPa of air blown out to the air conditioning zone 1d in the passenger compartment is calculated in accordance with control shown in FIG. 12. Here, the calculation of TAORrPa is substantially similar to that of TAORrDr except for the detected temperatures of the detection elements of the passenger seat side detection portion 72 which are used in the calculation of TAORrPa. As described above, in the case of TAORrDr, the detected temperatures of the detection elements of the driver seat side detection portion 71 are used. However, the other parts of the calculation of TAORrDr are similar to the calculation of TAORrPa. Accordingly, the calculation of TAORrPa is simply described in following.

At step S208 in FIG. 12, a rear left temperature TirRrPas is firstly calculated in accordance with the above-described formula (8a) by using the rear left trim panel temperature Tir-INRrPa, the rear left window surface temperature TirWRrPa, the rear left passenger's clothes temperature TirCRrPa and the rear left passenger's skin temperature TirSRrPa.

$$TirRrPas=0.3\times TirINRrPa+0.2\times TirWRrPa+0.14\times TirCRrPa+0.36\times TirSRrPa \quad (8a)$$

Next, at step S208a, a rear left temperature TirRrPad is calculated in accordance with the following formula (16) without using the rear left passenger's skin temperature TirSRrPa.

$$TirRrPad=0.3\times TirINRrPa+0.2\times TirWRrPa+0.5\times TirCRrPa \quad (16)$$

wherein, TirINRrPa, TirWRrPa, and TirCRrPa are the same with those used in the above formula (8a). "0.3", "0.2" and "0.5" are temperature setting gains (parameters).

At step S209a, a rear left target blowing-out temperature TAORrPaIRs of air blown out to the air conditioning zone 1d in the passenger compartment is calculated in accordance with the formula (17) by using the rear left temperature TirRrPas.

$$TAORrPaIRs=7\times TsetRrPa-5\times TirRrPas-40 \quad (17)$$

wherein, "7" and "5" are temperature setting gains (parameters), and "40" is a correction constant.

At step S209b, the rear left temperature TirRrPad is used instead of TirRrPas to calculate a rear left target blowing-out temperature TAORrPaTRd in accordance with the formula (18)

$$TAORrPaTRd=7\times TsetRrPa-5\times TirRrPad-40 \quad (18)$$

When the difference (|TAORrPaIRs−TAORrPaTRd|) between TAORrPaIRs and TAORrPaTRd is smaller than a set value (e.g., 20° C.), that is, when (TAORrPaTRd−20) <TAORrPaIRs<(TAORrPaTRd+20), it is determined that an obstacle having an abnormal temperature does not exist, and YES is determined at step S211a. Thus, at step S214, TAOR-rPaIRs is determined as a normal rear left target blowing-out temperature and the value of TAORrPaIRs is set as the rear left target blowing-out temperature TAORrPa.

On the other hand, when TAORrPaIRs is smaller than TAORrPaTRd and the difference between them is larger than the set value (e.g., 20° C.), it is determined that an abnormally low temperature obstacle (e.g., ice cream) exists between the detection element 717 and the rear left side passenger's face, and YES is determined at step S213a. In this case, the set value (e.g., 20° C.) is added to TAORrPaIRs so that TAOR-rPaIRs is corrected. Thus, the corrected TAORrPaIRs (i.e., TAORrPaIRs+20) is set as TAORrPa at step S214a.

On the other hand, when it is determined that TAORrPaIRs is larger than TAORrPaTRd and the difference between them is larger than the set value, NO is determined at step S213a. Thus, it is determined that an abnormally high temperature obstacle (e.g., fired cigarette) exists between the detection element 717 and the rear left side passenger's face. In this case, the set value (e.g., 20° C.) is subtracted from TAOR-rPaIRs so that TAORrPaIRs is corrected. The corrected TAORrPaIRs (i.e., TAORrPaIRs−20) is set as TAORrPa at step S215a.

According to the steps S208-S215a shown in FIG. 12, the target blowing-out temperature TAORrPa of air blown out to the air conditioning zone 1d in the passenger compartment is calculated.

According to the above-described second embodiment, the rear right target blowing-out temperature TAORrDrIRs and the rear left target blowing-out temperature TAORrPaIRs (first target temperature) are calculated corresponding to the right rear side seat and the left rear side seat by the air conditioning ECU 8, respectively. Moreover, the rear right target blowing-out temperature TAORrDrTRd and the rear left target blowing-out temperature TAORrPaTRd (second target temperature) are calculated corresponding to the right rear side seat and the left rear side seat by the air conditioning ECU 8, respectively. TAORrDrIRs and TAORrPaIRs are calculated based on the detected temperature Ta17 of the detection element 717 of the non-contact temperature sensor 70. TAORrDrTRd and TAORrPaTRd are calculated based on the detected temperatures Ta13-Ta16 of the detection elements 713-716 of the non-contact temperature sensor 70.

When an obstacle with an abnormal temperature exists between the detection element 717 of the non-contact temperature sensor 70 and the passenger's face, the detected temperatures Ta13-Ta16 are affected less by the abnormal temperature obstacle, as compared with the detected temperature Ta17. Therefore, TAORrDrTRd and TAORrPaTRd are influenced less by the obstacle as compared with TAOR-rDrIRs and TAORrPaIRs.

When it is determined that an obstacle having an abnormal temperature does not exist between the detection element 717 and the passenger's face, the open degrees of the air mix doors 65a, 65b are controlled according to the target blowing-out temperatures TAORrDrIRs and TAORrPaIRs, respectively.

When it is determined that an obstacle having an abnormal temperature exists between the detection element 717 and the passenger's face, TAORrDrIRs and TAORrPaIRs are respectively corrected to approach TAORrDrTRd and TAORr-PaTRd, and the target blowing-out temperatures TAORrDr and TAORrPa are calculated using the corrected TAORrDr-IRs and TAORrPaIRs.

Accordingly, TAORrDr and TAORrPa are influenced less by the obstacle having the abnormal temperature, as compared with TAORrDrIRs and TAORrPaIRs. Because the air conditioning ECU 8 controls the rear seat air conditioning unit 6 according to TAORrDr and TAORrPa, an abnormal control of the air conditioning due to an abnormal-temperature obstacle can be restricted.

Third Embodiment

According to the above-described first and second embodiments, the case is described in which an abnormal-temperature obstacle (e.g., ice cream or fired cigarette) exists between the non-contact temperature sensor 70 and a passenger in the passenger compartment.

In practice, obstacles having a room temperature such as a vanity mirror and a sun visor may exist between the non-contact temperature sensor 70 and the passenger. In this case, the skin temperature of the passenger and the like, which are used to calculate the target blowing-out temperatures TAORrDrIR and TAORrPaIR, cannot be accurately detected by the non-contact temperature sensor 70. If the air conditioning ECU 8 controls the rear seat air conditioning unit 6 according to the target blowing-out temperatures TAORrDrIR and TAORrPaIR, the air conditioning of the passenger compartment may be abnormally controlled.

In this embodiment, the target blowing-out temperatures TAORrDrIR and TAORrPaIR, which are influenced by the room-temperature obstacle, are respectively corrected to approach TAORrDrTR and TAORrPaTR, which are not influenced by the room-temperature obstacle, to calculate the target blowing-out temperatures TAORrDr and TAORrPa according to which the air conditioning ECU 8 controls the rear seat air conditioning unit 6. Accordingly, an abnormal control of the air conditioning due to the room-temperature obstacle can be restricted.

The target blowing-out temperature TAORrPa of the rear left air conditioning zone 1d will be calculated referring to FIGS. 13-15A, and 15B.

Figure 13:
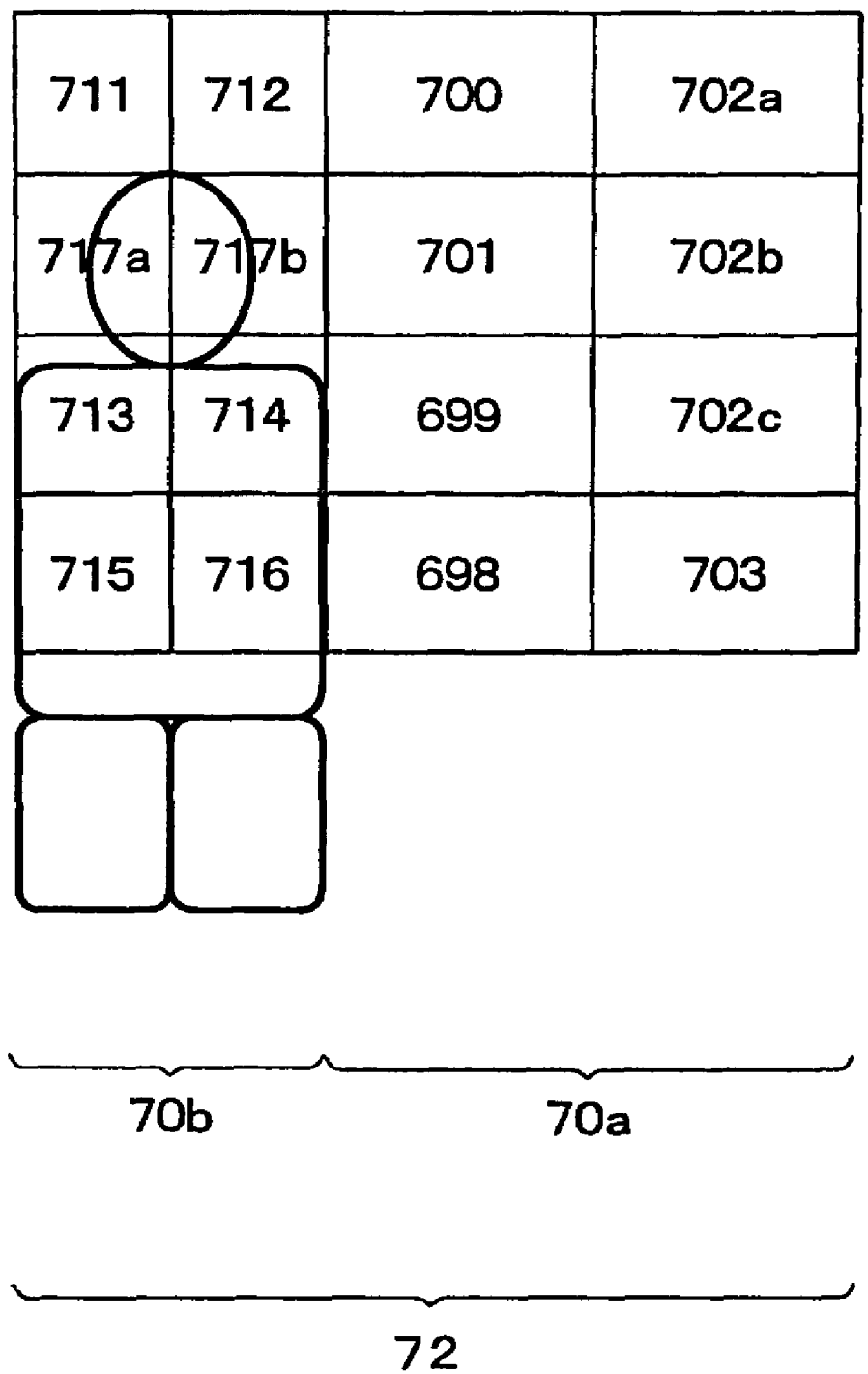
FIG. 13 is a view showing an arrangement of an assistant seat side detection portion of an infrared rays temperature sensor according to a third embodiment of the present invention.

As shown in FIG. 13, the assistant seat side detection portion 72 of the infrared rays temperature sensor 70 is provided with the infrared rays receiving portions 70a, 70b.

The infrared rays receiving portion 70a is provided with detection elements 698-703. Similarly to those of the first embodiment, the detection elements 700, 701 detect the temperature of the side window glass at the side of the assistant's seat 3 (i.e., front passenger's seat 3). The detection elements 702a, 702b and 702c detect the face skin temperature of the passenger at the seat 3. The detection element 703 detects the temperature of the upper-side clothes portion of the passenger at the seat 3.

Moreover, the infrared rays receiving portion 70b is provided with detection elements 711-716, 717a and 717b. The detection elements 713-716 detects the upper-side clothes portion of the passenger at the seat 4, and the detection elements 717a, 717b detect the face skin temperature of the passenger at the seat 4.

Temperature signals detected by the infrared rays receiving portions 70a, 70b are sampled by the air conditioning ECU 8 every a predetermined interval. That is, the air conditioning ECU 8 samples the detected temperature signals of the detection elements of the assistant seat side detection portion 72 at a first time, a second time . . . to a N time (N is integral) every a predetermined timing.

Figure 14:
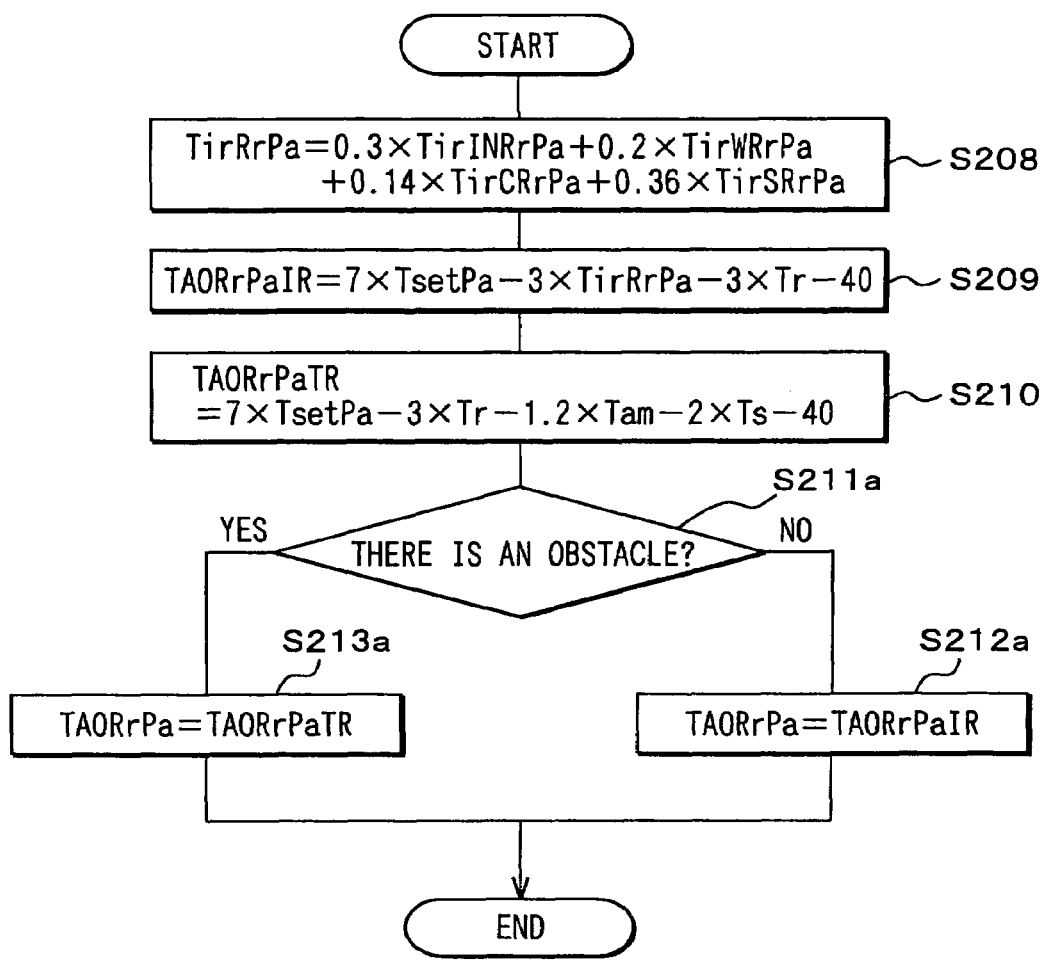
FIG. 14 is a flow chart for calculating a target blowing-out temperature of air blown out to a left rear side seat according to the third embodiment.

The target blowing-out temperature TAORrPa of air blown out to the air conditioning zone 1d in the passenger compartment is calculated by the air conditioning ECU 8 referring to FIG. 14. Steps S208, S209, S210 are substantially same with those shown in FIG. 9, respectively.

At step S208, a rear left temperature TirRrPa is firstly calculated. At step S209, a rear left target blowing-out temperature TAORrPaIR is calculated using the rear left temperature TirRrPa. At step S210, a rear left target blowing-out temperature TAORrPaTR is calculated using the inside air temperature signal TrRr.

At step S211a, according to the temperature signals detected by the detection elements of the assistant seat side detection portion 72, it is determined whether an obstacle having a room temperature exists between the assistant seat side detection portion 72 and the passenger's face at the left side of the rear seat 4 or not.

Figure 15A:
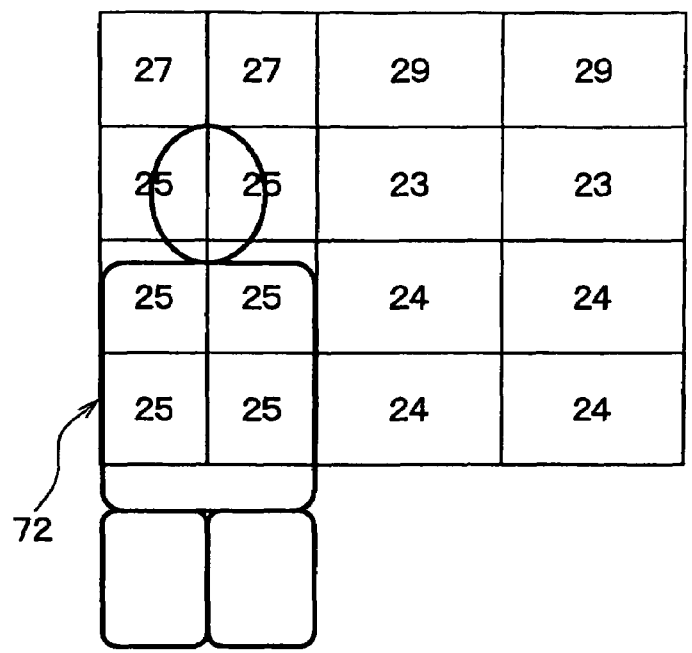
FIGS. 15A and 15B are views showing a temperature-detected state of the assistant seat side detection portion of the infrared rays temperature sensor according to the third embodiment.
Figure 15B:
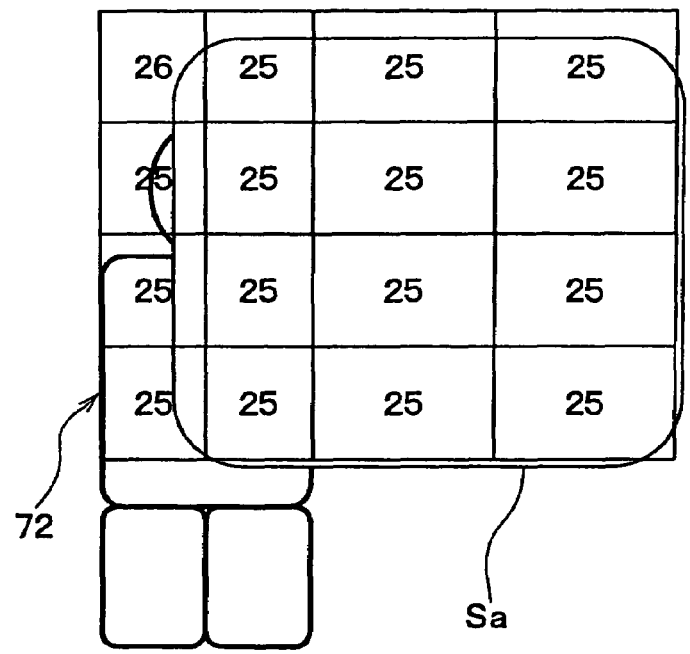

For example, as shown in FIG. 15B, when the number of the detection elements, which have an approximately same temperature T (e.g., in a range of (T−1° C.) and (T+1° C.)), exceeds a predetermined value (e.g., 14), it is determined that a room-temperature obstacle (e.g., vanity mirror) exists and YES is determined at step S211a. In this case, the detection elements in a rang indicated by Sa in FIG. 15B are obstructed by the obstacle. Generally, when the temperature of the passenger's face or a rear-tray sheet are detected, temperature differences between the multiple detection elements of the assistant seat side detection portion 72 are at least a number of degrees. If the number of the detection elements, which have the substantially same detected temperature, exceeds the predetermined value (e.g., 14), it is determined that the assistant seat side detection portion 72 is obstructed by an obstacle such as the vanity mirror.

The numbers indicated in FIGS. 15A, 15B show the detected temperatures of the detection elements of the assistant seat side detection portion 72. The numbers (e.g., 29) indicated in FIG. 15A show the detected temperatures of the detection elements of the assistant seat side detection portion 72 by sampling at (N−1) time, and the numbers indicated in FIG. 15B show the detected temperatures of the detection elements of the assistant seat side detection portion 72 by sampling at N time.

When it is determined that the obstacle exists, the value of the target blowing-out temperature TAORrPaTR is used as the value of the target blowing-out temperature TAORrPa at step S213a.

On the other hand, when the number of the detection elements does not exceed the predetermined value (e.g., 14) which have the approximately same temperature T (e.g., in a range of (T−1) ° C.-(T+1) ° C.), it is determined that the obstacle does not exist, and NO is determined at step S211a. The value of the target blowing-out temperature TAORrPaIR is used as the value of the target blowing-out temperature TAORrPa at step S212a.

Fourth Embodiment

In the above-described embodiment, if the number of the detection elements, which have the substantially same detected temperature, exceeds the predetermined value (e.g., 14) among the total (e.g., 16) detection elements, it is determined that an obstacle exists. In the fourth embodiment, an additional method will be used for determining whether an obstacle exists or not.

Figure 16A:
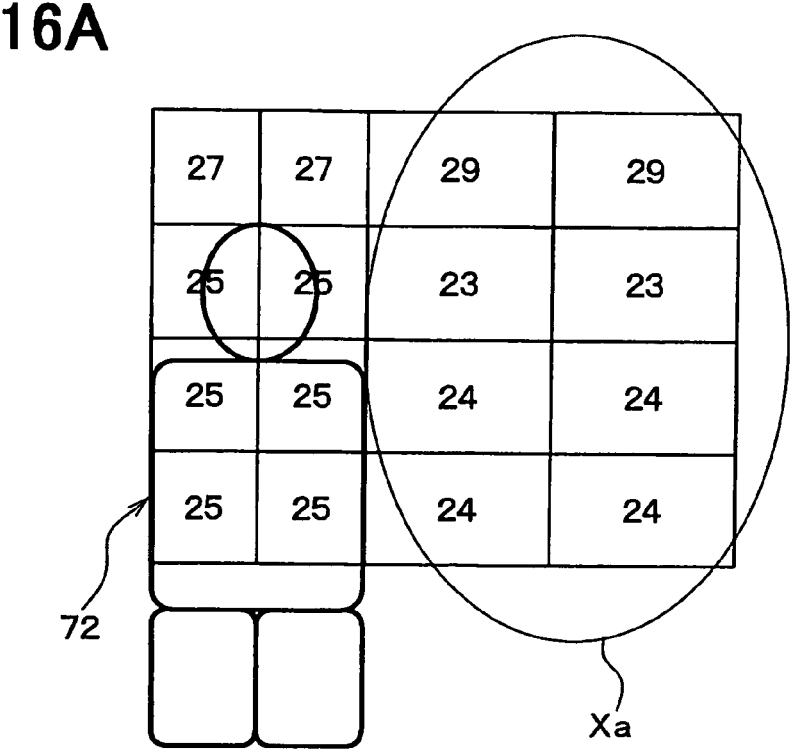
FIGS. 16A and 16B are views showing a temperature-detected state of an assistant seat side detection portion of an infrared rays temperature sensor according to a fourth embodiment of the present invention.
Figure 16B:
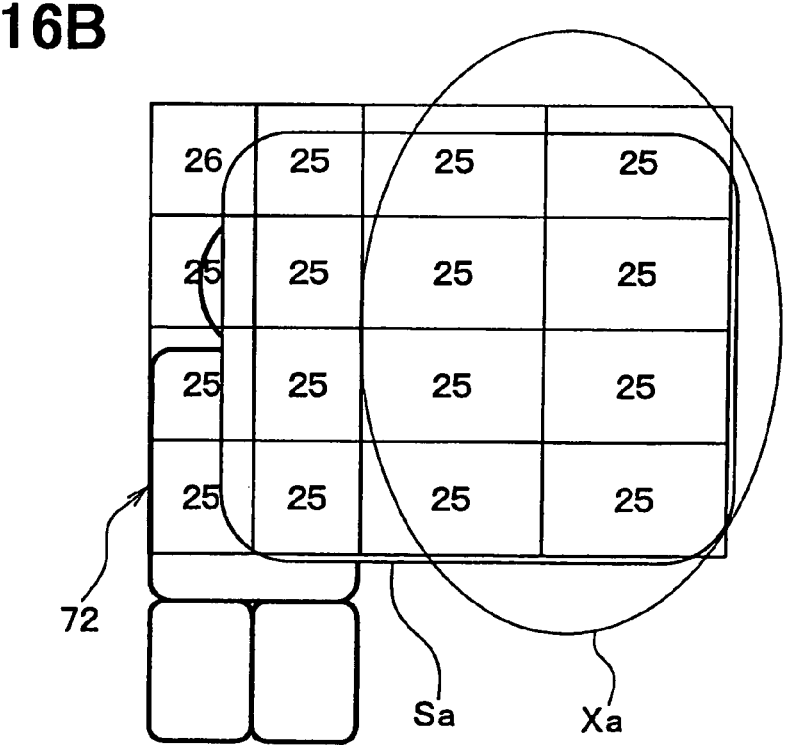

The numbers indicated in FIG. 16A show the detected temperatures of the detection elements of the assistant seat side detection portion 72 by sampling at (N−1) time, and the numbers indicated in FIGS. 16B show the detected temperatures of the detection elements of the assistant seat side detection portion 72 by sampling at N time.

According to this embodiment, the detected temperature sampled at n time (refer to FIG. 16B) of each detection element has a difference from the detected temperature sampled at (n−1) time (refer to FIG. 16A) of that. If the number of the detection elements, which have a difference between the detected temperature sampled at (n−1) time and the detected temperature sampled at n time larger than a predetermined value (e.g., 1° C.), exceeds a predetermined value (e.g., 8), it is determined that a room-temperature (e.g., vanity mirror) obstacle obstructs the assistant seat side detection portion 72, and YES is determined. Generally, when hands or a coffee cup is moved, the detected temperatures of a small number (e.g., 2 or 3) of the detection elements of the assistant seat side detection portion 72 change. If the number of the detection change elements, of which the detected temperatures at the same time, exceeds a predetermined value (e.g., 8), it is determined that the assistant seat side detection portion 72 is obstructed by a room-temperature obstacle. As shown in FIG. 16B, the detection elements in a range indicated by Xa are obstructed by an obstacle.

On the other hand, if the number of the detection elements which have a difference larger than 1° C. does not exceed the predetermined value (e.g., 8), it is determined that a room-temperature (e.g., vanity mirror) obstacle does not exist, and NO is determined.

Fifth Embodiment

In the fifth embodiment, according to the detected temperatures of two predetermined detection elements (indicated by Xb and Xc in FIGS. 17A and 17B) of the assistant seat side detection portion 72, it is determined whether there exists a room-temperature obstacle or not.

Figure 17A:
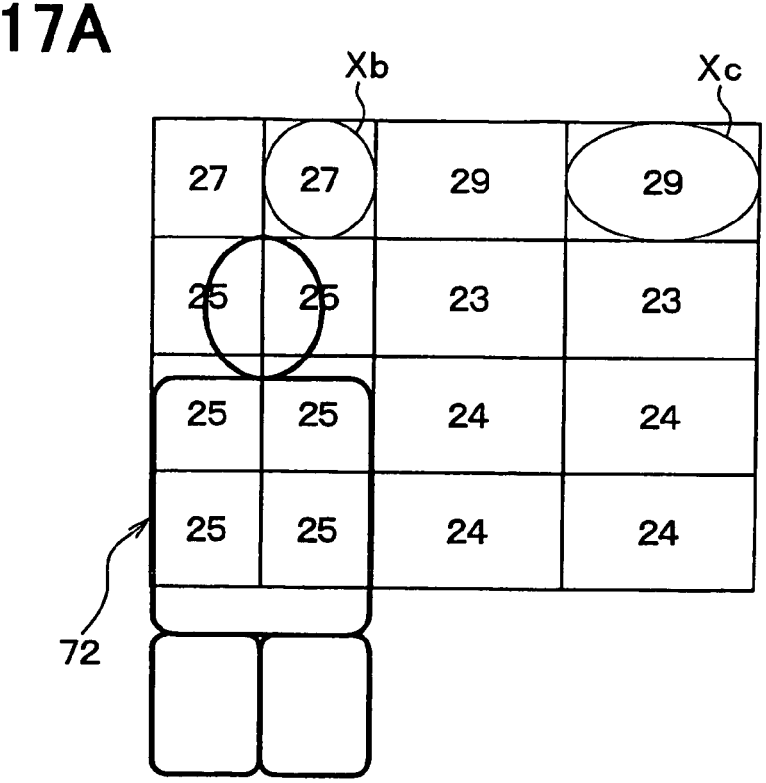
FIGS. 17A and 17B are views showing a temperature-detected state of an assistant seat side detection portion of an infrared rays temperature sensor according to a fifth embodiment of the present invention.
Figure 17B:
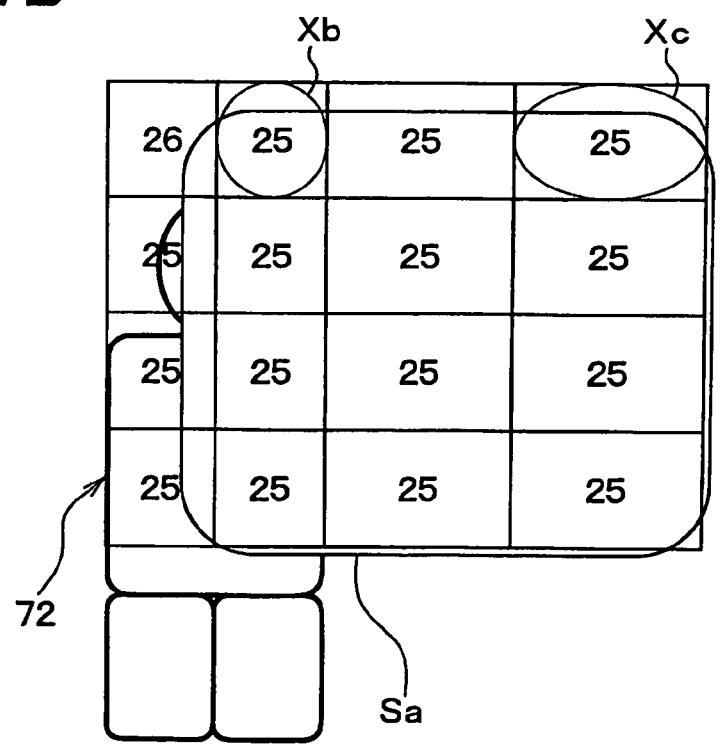

Generally, when hands or a coffee cup is moved, the detected temperatures of detection elements of the assistant seat side detection portion 72 adjacent to each other are changed. If the detected temperatures of two separated detection elements, between which at least one detection element is positioned, are increased or decreased by equal to or larger than a predetermined temperature value (e.g., 2° C.) at the same time, it is determined that the assistant seat side detection portion 72 is obstructed by a room-temperature obstacle. As shown in FIGS. 17A, 17B, the detection element 712 (indicated by Xb) and the detection element 702a (indicated by Xc) are separated form each other. If the differences between the detected temperatures sampled at (n−1) time of the detection elements 712, 702a and the detected temperatures sampled at n time of those are equal to or larger than the predetermined temperature (e.g., 2° C.), it is determined that there exists an obstacle, and YES is determined at step S211a in FIG. 14. If the differences of the detected temperatures of the two predetermined detection elements are smaller than the predetermined temperature value (e.g., 2° C.), it is determined that an obstacle does not exist and No is determined at step S211a FIG. 14.

In this embodiment, the detected temperatures of the predetermined two detection elements are used to determine whether an obstacle exists or not. However, a predetermined detection element can be also used.

Sixth Embodiment

In the above-described embodiment, if the detected temperatures sampled at n time of the two predetermined detection elements are increased or decreased by equal to or larger than the predetermined temperature difference (e.g., 2° C.) as compared with those sampled at (n−1) time, it is determined that there exists an obstacle. In this embodiment, more than two predetermined detection elements are used to determine whether an obstacle exists or not.

Figure 18A:
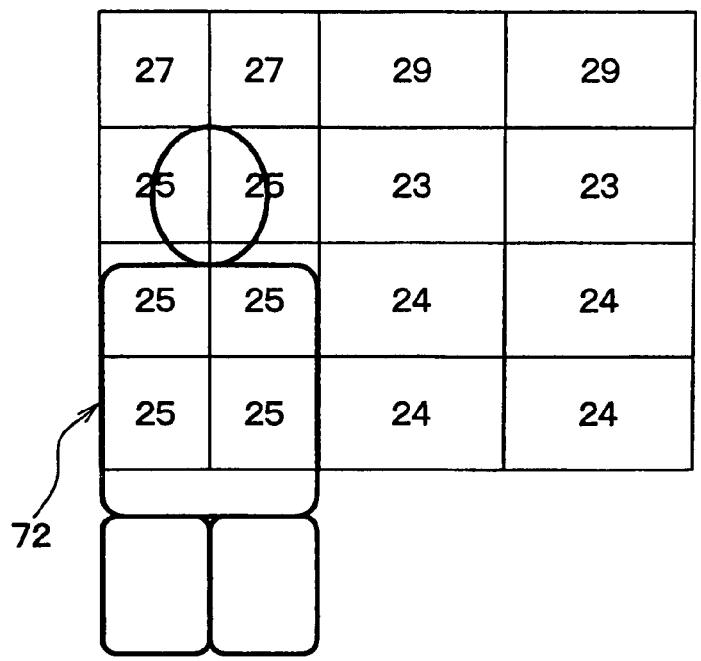
FIGS. 18A and 18B are views showing a temperature-detected state of an assistant seat side detection portion of an infrared rays temperature sensor according to a sixth embodiment of the present invention.
Figure 18B:
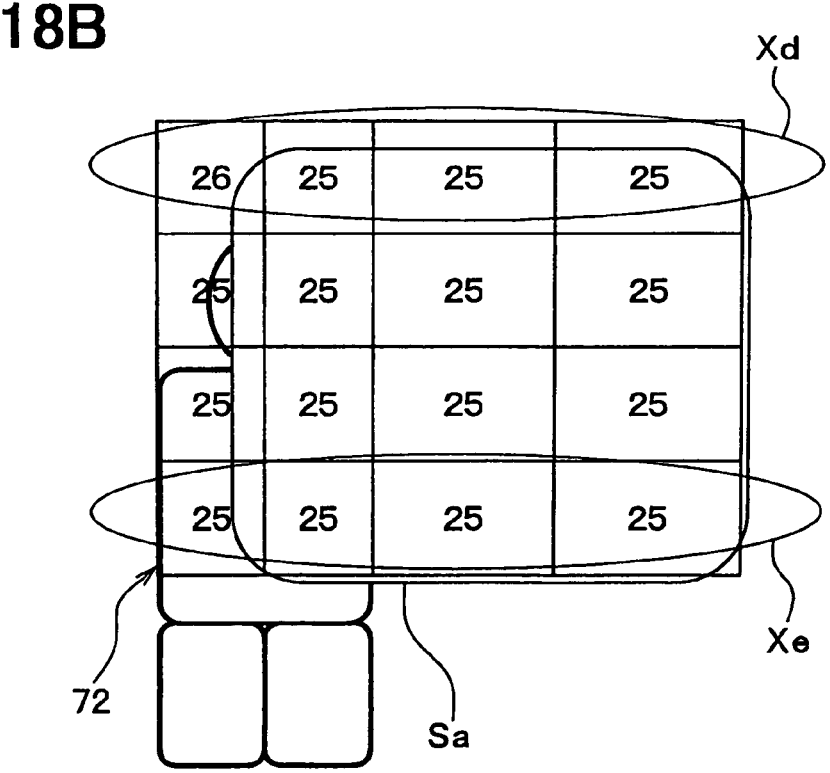

For example, an upper-side detection elements of the assistant seat side detection portion 72 are arranged to detect the temperature of the passenger's face or the rear-tray sheet, as shown in a rang indicated Xd in FIG. 18B. A lower-side detection elements of the assistant seat side detection portion 72 are arranged to detect the temperature of the passenger's thighs or seats, as shown in a range indicated Xe in FIG. 18B. Generally, the differences between the detected temperatures of the upper side and the lower side detection elements are at least a number of degrees. If the differences are in a predetermined range (e.g., (−1° C.)-(+1° C.)), it is determined that the assistant seat side detection portion 72 is obstructed by a room-temperature obstacle, and YES is determined at step S211a in FIG. 14. If the differences between the detected temperatures of the upper side and the lower side detection elements are out of the predetermined range (e.g., (−1° C.)-(+1° C.)), NO is determined at step S211a in FIG. 14.

In this embodiment, other detection elements in addition to the upper side and the lower side detection elements among the assistant seat side detection portion 72 can be also used to determine whether an obstacle exists or not.

Other Embodiments

Although the present invention has been fully described in connection with the preferred embodiments thereof with reference to the accompanying drawings, it is to be noted that various changes and modifications will become apparent to those skilled in the art.

For example, in the first embodiment, the target blowing-out temperatures TAORrDrIR, TAORrPaIR and the target blowing-out temperatures TAORrDrTR, TAORrPaTR are used to determine whether an abnormally high temperature obstacle (e.g., fired cigarette) exists between the detection element 717 and the rear left side passenger's face or not. However, the detected temperature Ta17 of the detection element 717 of the non-contact temperature sensor 70 can be also used. In this case, if the detected temperature Ta17 is in a predetermined range, it is determined that an abnormally high temperature obstacle does not exist between the detection element 717 and the passenger's face. If the detected temperature Ta17 is out of the predetermined range, it is determined that there exists an abnormally high temperature obstacle between the detection element 717 and the passenger's face.

Similarly, in the second embodiment, the detected temperature Ta17 of the detection element 717 can be also used to determine whether an obstacle exists between the detection element 717 and the passenger's face or not.

In the first embodiment, the temperature detection area in the passenger compartment is set as the passenger's face, and it is determined whether an obstacle exists between the detection element 717 and the passenger's face or not. However, the temperature detection area can be also set as other area in the passenger compartment in addition to the passenger's face.

In the first and third embodiments, the target blowing-out temperature is used as the air-conditioning control value. However, an air amount blown from the centrifugal type blower 62 can be also used as the air-conditioning control value.

In the first embodiment, as the non-contact temperature sensor 70, the infrared ray sensor is provided with thermopile detection elements. However, other infrared ray sensors can be also used which includes a bolometer-type detection element having a resistance with a large temperature coefficient, for example. Other surface temperature sensors which do not contact a surface of the detection object can be also used.

In the first embodiment, in the driver seat side detection portion 71, the rear right trim panel temperature TirINRrDr, the rear right window surface temperature TirWRrDr, and the rear right passenger's clothes temperature TirCRrDr are calculated by using average calculations shown in the formulas (5-1), (5-2), and (5-3). However, the present invention is not limited to this, the following formulas can be also used.

$$TirINRrDr=(K1\times Ta11+K2\times Ta12)/2 \quad (5\text{-}11)$$

$$TirWRrDr=(K3\times Ta00+K4\times Ta01)/2 \quad (5\text{-}21)$$

$$TirCRrDr=(K5\times Ta13+K6\times Ta14+K7\times Ta15+K8\times Ta16)/4 \quad (5\text{-}31)$$

Wherein K1-K8 are coefficients.

Similarly, in the passenger seat side detection portion 72, the rear left trim panel temperature TirINRrPa, the rear left window surface temperature TirWRrPa, and the rear left passenger's clothes temperature TirCRrPa are calculated by using average calculations shown in formulas (8-1), (8-2), and (8-3). However, the present invention is not limited to this, following formulas can be also used.

$$TirINRrPa=(K9\times Ta11+K10\times Ta12)/2 \quad (8\text{-}11)$$

$$TirWRrPa=(K11\times Ta00+K12\times Ta01)/2 \quad (8\text{-}21)$$

$$TirCRrPa=(K13\times Ta13+K14\times Ta14+K15\times Ta15+K16\times Ta16)/4 \quad (8\text{-}31)$$

Wherein K9-K16 are coefficients

In the first embodiment, the detected temperature TrRr of the inside air temperature sensor 85 is used a temperature signal which is influenced less than the temperature signal detected by the non-contact temperature sensor. However, the detected temperature Ta17 multiplied by a contribution degree K17 can be also used as the temperature signal. In this case, the contribution degree K17 must be smaller than the contribution degree of the detected temperature Ta17 which is used to calculate the target blowing-out temperatures TAORrDrIR, TAORrPaIR. For example, if the coefficient of the rear right passenger's skin temperature (Ta17) is 0.36 in the formula (5) in the first embodiment, the contribution degree K17 must be smaller than 036.

In the above-described embodiments, TAORrDrIR, TAORrPaIR are calculated as the first air-conditioning control value by using the detected temperatures of the infrared ray sensor 70. However, both of the detected temperatures of the infrared ray sensor 70 and the inside air temperature sensor 85 can be used to calculate the first air-conditioning control value.

In the above-described embodiments, the rear seat air conditioning unit 6 corresponds to the air conditioning unit in the present invention, and the rear right passenger's skin temperature (Ta17) corresponds to the surface temperature of the temperature detection area in the passenger compartment. TAORrDrIR, TAORrPaIR, TAORrDrIRs and TAORrPaIRs are calculated as the first air-conditioning control value, and the steps S200, S201, S208, S209, S201*a* and S209*a* corresponds to a first calculating means. TAORrDrTR, TAORrPaTR, TAORrDrTRs and TAORrPaTRs are calculated as the second air-conditioning control value, and the steps S202, S210, S200*a*, S201*b*, S208*a* and S209*b* corresponds to a second calculating means. The steps S203, S211, S203*a*, S211*a* correspond to a determining unit which determines whether an abnormal temperature obstacle exists between the temperature detection area and the non-contact temperature sensor or not. The air conditioning ECU 8 and the steps S121-S129, S204-S207, S212-S215, S204*a*-S207*a*, and S2121*a*-s215*a* are a control unit in the present invention.

Moreover, TAORrDr and TAORrPa correspond to a corrected air-conditioning control value in the present invention. The detection element 717 corresponds to a skin-temperature detection element, and the inside air temperature sensor 85 corresponds to a contact temperature sensor. The detection elements 713-716 correspond to clothes-temperature detection elements, and the air mix doors 65*a*, 65*b* correspond to a temperature adjusting unit in the present invention.

Such changes and modifications are to be understood as being within the scope of the present invention as defined by the appended claims.

What is claimed is:

1. An air conditioner for a vehicle comprising:
   an air conditioning unit for conditioning air in a passenger compartment of the vehicle;
   a non-contact temperature sensor for detecting a surface temperature of a temperature detection area in the passenger compartment in non-contact;
   first calculating means for calculating a first air-conditioning control value, which indicates a first target air conditioning state in the passenger compartment, based on the detected surface temperature of the non-contact temperature sensor;
   determining means for determining whether an obstacle exists between the temperature detection area and the non-contact temperature sensor;
   second calculating means for calculating a second air-conditioning control value indicating a second target air conditioning state in the passenger compartment based on a current inside air temperature of the passenger compartment when the determining means determines that the obstacle exists between the temperature detection area and the non-contact temperature sensor; and
   a control unit for controlling the air conditioning unit, wherein:
   when the determining means determines that the obstacle does not exist between the temperature detection area and the non-contact temperature sensor, the control unit controls the air conditioning unit based on the first air-conditioning control value; and
   when the determining means determines that the obstacle exists between the temperature detection area and the non-contact temperature sensor, the control unit controls the air conditioning unit based on the second air conditioning control value.

2. The air conditioner according to claim 1, wherein when a difference between the first air-conditioning control value and the second air-conditioning control value is larger than a predetermined value, the determining means determines that the obstacle exists between the temperature detection area and the non-contact temperature sensor.

3. The air conditioner according to claim 1, further comprising
   a contact temperature sensor for detecting an air temperature of the passenger compartment by contacting, wherein
   the second calculating means uses the detected air temperature of the contact temperature sensor as the temperature information for calculating the second air-conditioning control value.

4. The air conditioner according to claim 1, wherein the non-contact temperature sensor includes a skin temperature detection element for detecting a passenger's skin temperature as the surface temperature of the temperature detection area.

5. The air conditioner according to claim 1, wherein:
the non-contact temperature sensor includes a plurality of detection elements, which are arranged for detecting in non-contact the surface temperatures of corresponding parts separated in the temperature detection area; and
the determining means determines the obstacle exists between the temperature detection area and the non-contact temperature sensor when the number of the detection elements which have substantially the same detected surface temperature is equal to or larger than a predetermined number.

6. The air conditioner according to claim 1, wherein:
the non-contact temperature sensor includes a plurality of detection elements, which are arranged for detecting in non-contact the surface temperatures of corresponding parts separated in the temperature detection area; and
when the number of the detection elements, which have detected surface temperature changed by equal to or larger than a predetermined temperature at the same time, is equal to or larger than a predetermined value, the determining means determines the obstacle exists between the temperature detection area and the non-contact temperature sensor.

7. The air conditioner according to claim 1, wherein:
the non-contact temperature sensor includes a plurality of detection elements, which are arranged for detecting in non-contact the surface temperatures of corresponding parts separated in the temperature detection area; and
when the detected surface temperature of predetermined detection elements among the plurality of detection elements changes by equal to or larger than a predetermined temperature, the determining means determines the obstacle exists between the temperature detection area and the non-contact temperature sensor.

8. The air conditioner according to claim 7, wherein
the predetermined detection elements of the plurality of detection elements are at least two detection elements separated from each other.

9. The air conditioner according to claim 1, wherein:
the non-contact temperature sensor includes a plurality of detection elements, which are arranged for detecting in non-contact the surface temperatures of corresponding parts separated in the temperature detection area; and
when the detected surface temperature of predetermined detection elements among the plurality of detection elements are substantially same, the determining means determines that the obstacle exists between the temperature detection area and the non-contact temperature sensor.

10. The air conditioner according to claim 9, wherein the predetermined detection elements are upper side detection elements and lower side detection elements among the plurality of detection elements.

11. The air conditioner according to claim 1, wherein:
the air conditioning unit includes a plurality of temperature adjusting units for adjusting the temperature of air to be blown into the passenger compartment; and
the first and second calculating units calculate the first and second target temperatures to be adjusted by the temperature adjusting units, as the first and the second air-conditioning control values, respectively.

12. The air conditioner according to claim 11, wherein:
the temperature adjusting units are arranged to correspond to seats in the passenger compartment, respectively;
the non-contact temperature sensor detects the surface temperature corresponding to each of the seats of the temperature detection area;
the first and the second calculating means respectively calculate the first and the second target temperatures corresponding to each of the seats;
the determining means determines whether the obstacle exists between the non-contact temperature sensor and the temperature detection area in each of the seats;
when the determining means determines that the obstacle does not exist between the non-contact temperature sensor and the temperature detection area, the control unit controls the temperature adjusting units based on the first target temperature; and
when the determining means determines that the obstacle exists between the non-contact temperature sensor and the temperature detection area, the control unit corrects the first target temperature to be the second target temperature so as to calculate a corrected target temperature used as the corrected air-conditioning control value, and the control unit controls the temperature adjusting units based on the corrected target temperature.

13. The air conditioner according to claim 1, wherein the determining means is for determining whether an obstacle having a temperature near the current inside air temperature exists.

14. The air conditioner according to claim 1, wherein the obstacle includes a vanity mirror and a sun visor.

15. The air conditioner according to claim 1, wherein the obstacle is a stationary obstacle.

16. The air conditioner according to claim 15, wherein the current inside air temperature is not used by the first calculating means when calculating the first air-conditioning control value.

17. The air conditioner according to claim 1, wherein the current inside air temperature is not used by the first calculating means when calculating the first air-conditioning control value.

* * * * *